US009048961B2

(12) United States Patent
Fujita et al.

(10) Patent No.: US 9,048,961 B2
(45) Date of Patent: Jun. 2, 2015

(54) AUDIO SIGNAL PROCESSING APPARATUS

(75) Inventors: Hiroaki Fujita, Hamamatsu (JP); Masaaki Okabayashi, Hamamatsu (JP); Kotaro Terada, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 626 days.

(21) Appl. No.: 13/188,382

(22) Filed: Jul. 21, 2011

(65) Prior Publication Data

US 2012/0020498 A1 Jan. 26, 2012

(30) Foreign Application Priority Data

Jul. 21, 2010 (JP) ................................ 2010-164389
Jul. 21, 2010 (JP) ................................ 2010-164390
Oct. 22, 2010 (JP) ................................ 2010-238057
Oct. 22, 2010 (JP) ................................ 2010-238058

(51) Int. Cl.
*H04B 1/00* (2006.01)
*H04H 60/04* (2008.01)

(52) U.S. Cl.
CPC .................................... *H04H 60/04* (2013.01)

(58) Field of Classification Search
CPC ........... H04H 60/04; H03G 3/00; H03G 3/20; H03G 3/3036
USPC .......... 381/119, 104, 120; 711/100, 154, 158; 700/94
See application file for complete search history.

(56) References Cited

U.S. PATENT DOCUMENTS 4,879,751 A * 11/1989 Franks et al. ................ 381/119
6,091,012 A * 7/2000 Takahashi ...................... 84/626
2007/0025568 A1* 2/2007 Aiso et al. .................... 381/119

(Continued)

FOREIGN PATENT DOCUMENTS

JP 2008-227761 9/2008

OTHER PUBLICATIONS

Yamaha Corp. (2002). Digital Audio Mixing System PM1D System Software V1.41, Console Surface CS1D Operation Manual, 629 pgs. (submitted in six parts).

(Continued)

*Primary Examiner* — Davetta W Goins
*Assistant Examiner* — Oyesola C Ojo
(74) *Attorney, Agent, or Firm* — Morrison & Foerster LLP

(57) ABSTRACT

An audio signal processing apparatus performs audio signal process composed of a plurality of channels each having parameters used in the audio signal process. The audio signal processing apparatus has a plurality of channel strips, each being assigned with a channel and being provided with controls for adjusting values of the parameters of the assigned channel, and has a plurality of storing sections having different priorities relative to each other, each storing section being capable of storing a setting indicative of a channel set to a channel strip for assignment thereto. A changing section changes a setting stored in a storing section. A clearing section clears a setting stored in a storing section. An assigning section is activated when a setting stored in one of the plurality of the storing sections is changed by the changing section or cleared by the clearing section, then refers to all of the storing sections that currently store the settings for a channel strip, and assigns a channel to the channel strip according to the setting stored in a storing section having the highest priority among the storing sections referred to by the assigning section.

9 Claims, 23 Drawing Sheets

(56) References Cited

U.S. PATENT DOCUMENTS

| | | | |
|---|---|---|---|
| 2008/0219478 | A1 | 9/2008 | Aoki et al. |
| 2011/0274294 | A1 | 11/2011 | Fujita et al. |

OTHER PUBLICATIONS

Yamaha Corp. (2005). Digital Mixing Console M7CL, English language, 282 pages.

European Search Report mailed Nov. 29, 2011, for EP Patent Application No. 11174661.6, eight pages.

European Search Report mailed Nov. 29, 2011, for EP Patent Application No. 11164881.2, eight pages.

Non-Final Office Action mailed Jun. 10, 2014, for U.S. Appl. No. 13/101,954, filed May 5, 2011, five pages.

Non-Final Office Action mailed Oct. 10, 2013, for U.S. Appl. No. 13/101,954, filed May 5, 2011, 9 pages.

* cited by examiner

EXPANSION SWITCH HAS BEEN DEPRESSED AFTER U1 IS DESIGNATED AS A GROUP TO BE EXPANDED (CHANNELES 9, 11, 13, 15, 17, AND 19 BELONG TO GROUP U1)
(a)
(b)
EXPANSION LAYER REGISTER
FIXED LAYER REGISTER
BASE LAYER REGISTER
ASSIGNMENT CHANNEL STORAGE REGION
2101
2102
2103
2104
2111
2112
2113
2114
CHANGE DATA
MAINTAIN DATA
MAINTAIN DATA
CHANGE DATA
none
U1
B1(ch1)
B1(ch2)
B1(ch3)
B1(ch4)
B1(ch5)
B1(ch6)
B1(ch7)
B1(ch8)
ch2
ch3
ch4
ch5
ch6
ch7
ch8
ch9
ch11
ch13
ch15
ch17
ch19

AUDIO SIGNAL PROCESSING APPARATUS

BACKGROUND OF THE INVENTION

1. Technical Field of the Invention

The present invention relates to an audio signal processing apparatus having functions to assign channels to controls provided on a manipulation panel, and relates to set and change values of parameters of the assigned channels through manipulation of the controls.

2. Description of the Related Art

There is known an audio signal processing apparatus which includes a plurality of channel strips, each having controls such as a fader, a rotary encoder, and various buttons, and which assigns input channels to the channel strips and allows the user to adjust the values of various parameters of an input channel through controls on a channel strip corresponding to the input channel. For example, the following Non-Patent Reference 1 (see Section 4 "Basic Operation of Input Channel") describes, on pages 32 and 33, a console of an audio mixing system in which layer data is assigned to each "channel strip portion" which is an array of channel strips and the assigned layer data is switched to make it possible to control many channels using a limited number of channel strips. The term "layer data" refers to data defined to specify channels (assignment channels) which are to be assigned to channel strips included in a channel strip portion (channel strip array).

Patent Reference 1 describes a mixer that allows a user to create user layer data separately from default layer data provided by the manufacturer. That is, the mixer allows the user to specify channels (assignment channels) assigned to channel strips included in a channel strip portion to create a piece of user layer data. Channel strips, for which assignment channels are not specified but instead "current state maintained" is specified, may be set in the user layer data. For example, when the layer data calling state has been switched from the calling state of first layer data to that of second layer data (which is referred to as user layer data), previous assignment channels of the first layer data remain unchanged for each channel strip for which "current state maintained" is specified in the second layer data.

A function to group and control a plurality of desired input channels is described in Non-Patent References 1 and 2. For example, a plurality of input channels may be assigned to a "DCA group", and the levels of the input channels may then be collectively adjusted using a DCA fader while maintaining level differences of the input channels, or a plurality of input channels may be assigned to a "mute group" and mute of the input channels may then be collectively turned on/off by turning a specific key on/off (see Section 7 "DCA Group" on pages 92 to 98 of Non-Patent Reference 1 and Section 11 "Grouping/Link" on pages 100 to 119 of Non-Patent Reference 2). A channel link function, which links desired parameters of a plurality of input channels belonging to a group, is described on pages 120 and 121 of Non-Patent Reference 2.

Although the function, which enables a plurality of channels to be grouped into a group and to be collectively manipulated using one control as described above, is convenient, users may also desire to individually manipulate the plurality of channels of the group. Thus, a digital mixer is provided, which allows a group to be expanded into individual channels to be assigned to a channel strip portion through specific manipulation. In this digital mixer, when a button of a desired group is depressed, individual input channels of the group are sequentially assigned to channel strips, allowing the user to individually manipulate the input channels.

[Patent Reference 1] Japanese Patent Application Publication No. 2008-227761

Non-Patent References

[Non-Patent Reference 1] DIGITAL AUDIO MIXING SYSTEM PM1D, CONSOLE SURFACE CS1D, OPERATION MANUAL (BASIC OPERATION), 2002, YAMAHA

[Non-Patent Reference 2] DIGITAL MIXING CONSOLE M7CL, INSTRUCTION MANUAL, 2005, YAMAHA However, for example, the user may desire a channel, to which vocals or the like are assigned, to be always assigned to a specific channel strip on the panel since there is a need to always monitor or frequently adjust the vocal channel. The user may also desire to use other channel strips than the specific channel strip while switching assignments of various channels to the other channel strips. For example, in the case where eight channel strips 1 to 8 are provided on a channel strip portion of the manipulation panel, the user may desire to adjust the vocal channel always using the eighth channel strip while switching assignments of various channels to the first to seventh channel strips.

In this case, if layer data is switched, assignments of all eight channel strips are changed, causing inconvenience of use. If the user previously creates a plurality of user layer data specifying assignments that the user desires to use, it is possible to perform desired assignment by calling the previously created user layer data. However, this requires the user to conduct a troublesome task of previously creating a plurality of such user layer data.

Therefore, the present inventors have suggested mixers in which a plurality of layers is defined such that layer data can be independently set in each of the layers and layer data set in a higher layer is given higher priority. This mixer of the previous work (not prior art) is disclosed in the co-pending U.S. patent application Ser. No. 13/101,954. Accordingly, by replacing layer data of each layer, it is possible to increase the degree of freedom of assignment of channels to a channel strip portion while allowing the user to implement desired channel assignment without much trouble. However, replacement of layer data of a plurality of layers makes it difficult to determine which assignment has been done, causing inconvenience.

Especially, merely assigning layer data of a higher layer when layer data of one of a plurality of layers has been changed may result in assignment contrary to the intention of the user. For example, in the case where a layer for expanding a plurality of channels grouped as a highest layer has been set, the layer is always given higher priority even though the user desires to temporarily use the layer. Thus, there is a problem in that, when layer data of a layer lower than the layer has been changed, such change is not immediately applied.

In addition, the user may desire to temporarily call layer data (for example, the user may desire to temporarily expand and assign channels, which have been grouped such that the channels can be collectively adjusted using a channel strip, to individual channel strips). In this case, the user may desire to return the assignment states to original states after such layer data is called. However, the user needs to remember layer data specifying original assignment states and then to call the layer data since there is no means for returning to original assignment states of the layer. This is very troublesome.

SUMMARY OF THE INVENTION

Therefore, it is an object of the invention to provide an audio signal processing apparatus in which assignment of channels to a plurality of channel strips of a channel strip portion can be changed by arranging data specifying channels for assignment in a plurality of layers, the apparatus allowing a user to implement desired assignment states according to their intention even when data of a layer has been changed.

It is another object of the invention to provide an audio signal processing apparatus in which assignment of channels to a plurality of channel strips of a channel strip portion can be changed by arranging data specifying channels for assignment in a plurality of layers, wherein a means for releasing arrangement of channels in a layer is provided such that the user can easily temporarily change states of assignment of channels to channel strips and return to desired assignment states according to their intention without trouble.

In order to achieve the above objects, there is provided an audio signal processing apparatus for performing audio signal process composed of a plurality of channels each having parameters used in the audio signal process, the audio signal processing apparatus comprising: a plurality of channel strips, each channel strip being assigned with a channel and being provided with controls for adjusting values of the parameters of the assigned channel; a plurality of storing sections having different priorities relative to each other, each storing section being capable of storing a setting indicative of a channel set to a channel strip for assignment thereto; a changing section that changes a setting stored in a storing section; a clearing section that clears a setting stored in a storing section; and an assigning section that is activated when a setting stored in one of the plurality of the storing sections is changed by the changing section or cleared by the clearing section, then refers to all of the storing sections that currently store the settings for a channel strip, and assigns a channel to the channel strip according to the setting stored in a storing section having the highest priority among the storing sections referred to by the assigning section.

In a preferred from, the clearing section automatically clears a first setting stored in a first one of the plurality of the storing sections, when the changing section changes a second setting stored in a second one of the plurality of the storing sections, the second one being different from the first one of the storing sections.

In a preferred form, the clearing section automatically clears a first setting stored in a first one of the plurality of the storing sections, the first one having a higher priority than a second one of the plurality of the storing sections, when the changing section changes a second setting stored in the second one of the storing sections.

In a preferred form, the clearing section automatically clears a first setting stored in a first one of the plurality of the storing sections, the first one having the highest priority among the plurality of the storing sections, when the changing section changes a second setting stored in a second one of the plurality of the storing sections, the second one not having the highest priority.

In a preferred form, the clearing section does not clear any setting stored in any of the plurality of the storing sections, when the changing section changes the first setting stored in the first one of the storing sections having the highest priority.

In an expedient form, the audio signal processing apparatus further comprises: an instructing section that inputs a clearing instruction; and a detecting section that detects one of the plurality of the storing sections in response to the clearing instruction, wherein the clearing section clears the setting stored in the detected one of the storing sections.

Preferably, the detecting section detects the storing section which has a priority other than the lowest priority among the plurality of the storing sections and which has a highest priority among a group of storing sections that currently store the settings.

Preferably, the clearing section does not clear any setting stored in any of the plurality of the storing sections when the detecting section detects none of the storing sections in response to the clearing instruction.

According to the invention, in an audio signal processing apparatus in which assignment of channels to a plurality of channel strips of a channel strip portion can be changed by arranging setting data specifying channels for assignment in a plurality of layers (storing sections), a user can easily implement desired assignment states according to their intention without trouble even when setting data of a layer has been changed.

In addition, in an audio signal processing apparatus in which assignment of channels to a plurality of channel strips of a channel strip portion can be changed by arranging setting data specifying channels for assignment in a plurality of layers, the user can easily temporarily change states of assignment of channels to channel strips and return to desired assignment states according to their intention without trouble.

DETAILED DESCRIPTION OF THE INVENTION

Embodiments of the invention will now be described with reference to the drawings.

Figure 1:
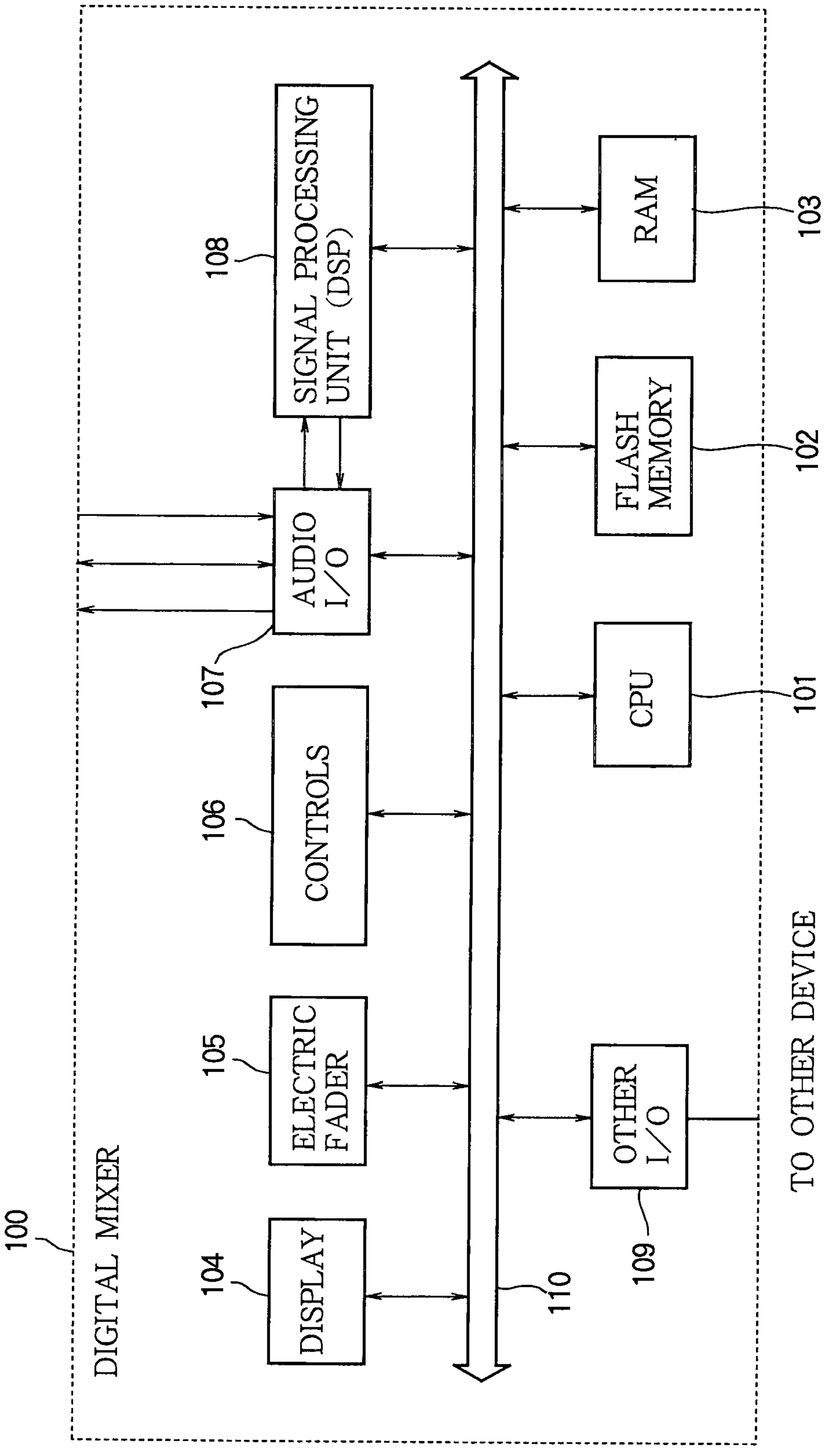
FIG. 1 illustrates a hardware configuration of a digital mixer according to a first embodiment of the invention.

FIG. 1 is a block diagram illustrating a hardware configuration of a digital mixer 100 according to a first embodiment of the invention. A Central Processing Unit (CPU) 101 is a processing device that controls the overall operation of the mixer. A flash memory 102 is a nonvolatile memory that stores various programs executed by the CPU 101, various data, and the like. A Random Access Memory (RAM) 103 is a volatile memory used as a work area or a load area of a program executed by the CPU 101. A display 104 is a touch panel display device provided on a control panel of the mixer for displaying a variety of information, and can detect touch manipulations. Electric faders 105 are controls for level setting, which are provided on the manipulation panel (control panel). The controls 106 are various controls (other than electric faders) for manipulation by the user, which are provided on the manipulation panel. An audio input/output (I/O) interface 107 is an interface for exchanging audio signals with an external device. A signal processing unit (DSP) 108 executes various microprograms based on instructions from the CPU 101 to perform a mixing process, an effect imparting process, an audio volume level control process, and the like on an audio signal received through the audio I/O interface 107, and outputs the processed audio signal through the audio I/O interface 107. Another I/O interface 109 is an interface for connection to another device. A bus 110 is a set of bus lines for connection between these components and collectively refers to a control bus, a data bus, and an address bus. In addition, the term "signal", as used in this specification, refers to an audio signal unless specifically stated otherwise (for example, unless stated as a control signal).

Figure 2:
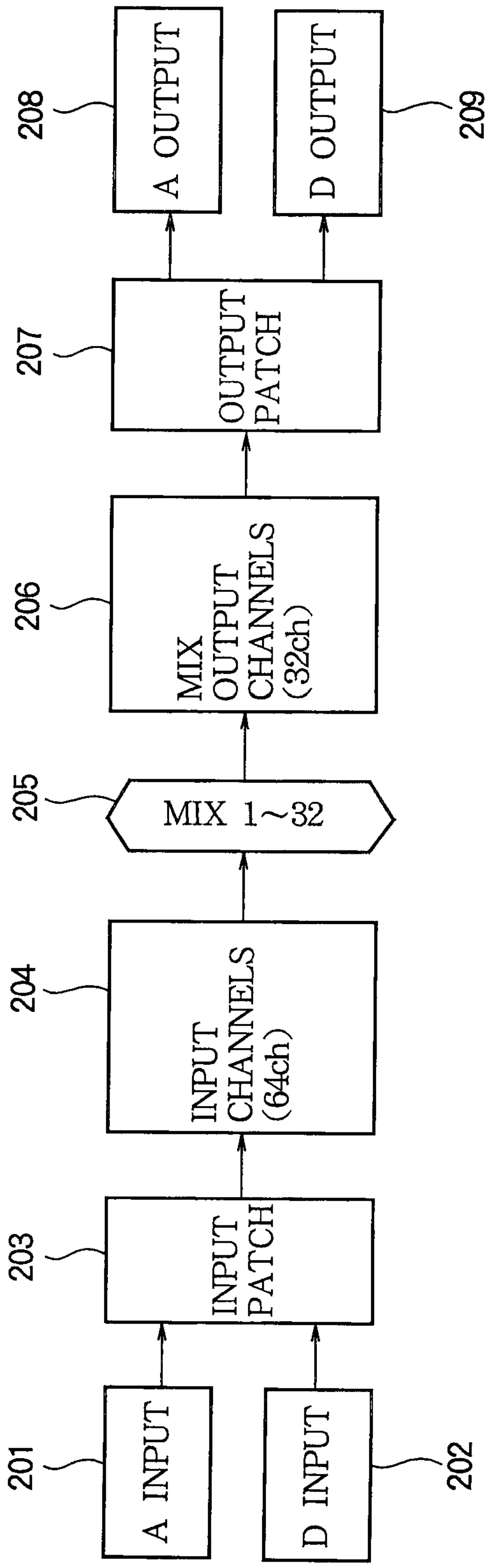
FIG. 2 is a block diagram illustrating mixing processing of the digital mixer.

FIG. 2 is a block diagram illustrating a functional configuration of a mixing process implemented through the mixer of FIG. 1. Reference numeral "201" denotes an analog input unit for receiving and converting an analog audio signal input through a microphone or the like into a digital signal. Reference numeral "202" denotes a digital input unit for receiving a digital audio signal. Each of the input units (201 and 202) receives a plurality of audio signal inputs, the number of which has an upper limit depending on the configuration of the mixer. An input patch 203 performs desired line connection (patching) from the inputs to input channels (ch) 204. The user may arbitrarily set such line connections while viewing a specific screen. The input channels 204 include sixty four single channels. Each input channel 204 performs various signal processing, such as level control and adjustment of frequency characteristics, on an input signal based on set parameters. A signal of each input channel 204 may be selectively output to thirty two mix buses 205 and the send level of each input channel 204 may be independently set.

Each of the thirty two mix buses 205 mixes signals input from the input channels 204. The mixed signal of each mix bus 205 is output to one of thirty two output channels 206 (1st to 32nd channels) corresponding to the mix bus. The mix buses 205 have one-to-one correspondence with the output channels 206. Each output channel performs various output signal processing based on current values of set parameters. Outputs of the output channels 206 are input to an output patch 207. The output patch 207 performs desired line connection from the output channels 206 to an analog output unit 208 or a digital output unit 209. The user may arbitrarily set such line connections while viewing a specific screen.

The input units 201 and 202 and the output units 208 and 209 are implemented through the audio I/O interface 107. The DSP 108 implements other parts 203 through 207 by executing a microprogram. The CPU 101 sets the microprogram by sending the microprogram to the DSP 108. The CPU 101 also sets parametric data used when executing the microprogram by sending the parametric data to the DSP 108.

Each component of the mixer 100 shown in FIG. 2 has various parameters. Current values of the parameters (current data) are stored in a current memory set in the flash memory 102 or the RAM 103. Setting of signal processing of the components in the mixer 100 or setting of panel states is performed based on current data stored in the current memory. That is, the mixer 100 is designed such that operations of the components of the mixer 100 can be controlled by setting or changing values of various parameters in the current memory. Current data of all parameters associated with the mixer 100 is stored in the current memory and current data in the current memory is changed (adjusted) according to various manipulations performed using the controls 105 and 106 or the touch panel display 104.

Figure 3:
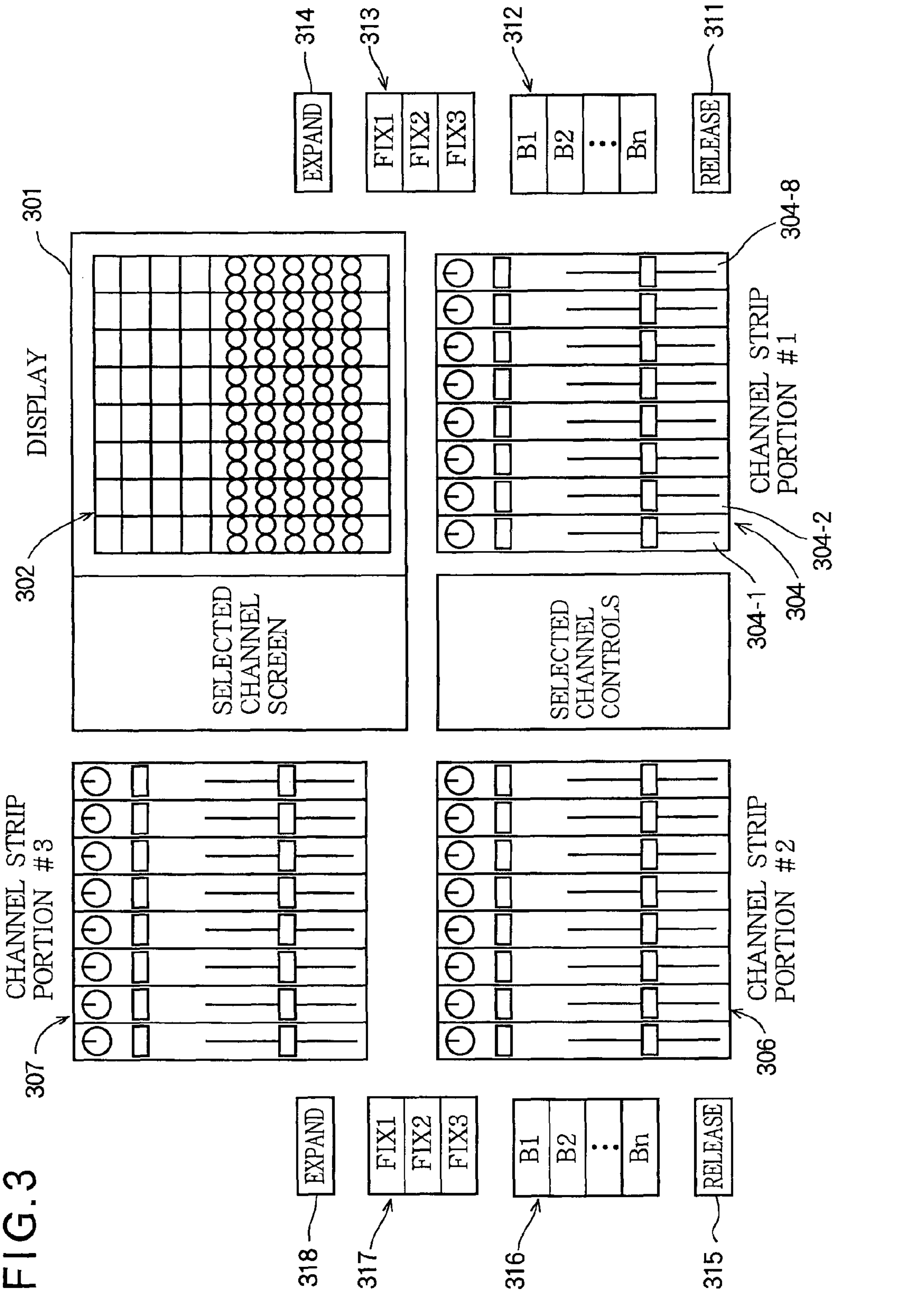
FIG. 3 illustrates an external appearance of a manipulation panel of the digital mixer.

FIG. 3 illustrates an external appearance of (a part of) the manipulation panel of the digital mixer of this embodiment. Reference numeral "301" denotes a display (corresponding to the display 104 in FIG. 1) for displaying a variety of information. A first channel strip portion 304 (corresponding to the electric faders 105 or the controls 106 in FIG. 1) is provided below the display 301. The channel strip portion 304 is an array of eight channel strips 304-1 to 304-8. One channel strip, for example, the channel strip 304-1, includes a rotary encoder, several switches, an electric fader, and the like. Each of the second and third channel strip portions 306 and 307 also includes eight channel strips, similar to the first channel strip portion 304.

In a region 302 of the display 301 above the channel strip portion 304, display regions (referred to as "channel parameter display regions") of parameters of channels assigned respectively to the channel strips 304-1 to 304-8 of the channel strip portion 304 are arranged and displayed above the channel strips 304-1 to 304-8 at positions corresponding to the channel strips 304-1 to 304-8. The same number of channel parameter display regions (eight channel parameter display regions in this example) as the number of channel strips provided on the channel strip portion 304 are displayed in the region 302.

Each channel parameter display region implements a parameter display function to display various parameters of a channel assigned to the channel parameter display region. That is, a channel assigned to each channel parameter display region corresponds to a channel assigned to a corresponding channel strip. That is, the corresponding channel strip is a channel strip that is located below the channel parameter display region. Software (or virtual) controls used to adjust the values of various parameters of the channel assigned to the channel parameter display region are displayed in the channel parameter display region. The channel parameter display region implements a function to adjust various parameters of the channel through direct touch manipulation of the corresponding software controls (graphic o virtual controls) or through manipulation of corresponding actual controls after the software controls are touched to be selected. The controls for adjusting the values of the parameters indicate both hardware (or physical) controls (such as electric faders, rotary encoders, and switches) physically provided on the channel strip portion 304 and various software controls in the channel parameter display regions in the region 302. Upon detection of a manipulation of an adjustment control, the value of a parameter (the corresponding value of current data in the current memory), which is to be handled by the manipulated adjustment control, in a channel assigned to a channel parameter display region or a channel strip including the manipulated adjustment control is changed (adjusted) to a value according to the current (detected) manipulation.

Reference numerals "311" to "314" denote switches for manipulating layer data corresponding to the first channel strip portion 304 and reference numerals "315" to "318" denote the same switches corresponding to the second channel strip portion 306. Details of these switches will be described later. Here, it is assumed that the same switches are provided for every channel strip portion although switches corresponding to the third channel strip portion 307 are not illustrated.

A layer for assigning channels to each of the channel strip portions 304, 306, and 307 will now be described. Assignment of channels to each channel strip portion is performed by arranging layer data in a layer corresponding to the channel strip portion.

Each channel strip portion includes a plurality of layers for arranging layer data. Specifically, storage regions of the layer data of the layers are provided in the current memory. In this embodiment, each channel strip portion has three layers, an expansion layer, a fixed layer, and a base layer, and an expansion layer data region, a fixed layer data region, and a base layer data region are provided as storage regions corresponding to the three layers. Only one piece of layer data can be stored in one storage region corresponding to one layer of one channel strip portion. In this embodiment, storing layer data of a layer in a storage region corresponding to the layer when the layer data to be used in the layer has been newly designated (or indicated) is referred to as "to arrange layer data in a layer". A "process for assigning" a channel to each channel strip is not yet performed when layer data is arranged in a layer. The "assignment process" will be described later.

Arrangement of layer data is performed independently for each layer. That is, a plurality of layer data may be simultaneously arranged in one channel strip portion (for example, the channel strip portion 304) by arranging layer data in each of a plurality of layers (an expansion layer, a fixed layer, and a base layer in this example) of the channel strip portion. Layer data to be arranged in the base layer is referred to as "base layer data", layer data to be arranged in the fixed layer is referred to as "fixed layer data", and layer data to be arranged in the expansion layer is referred to as "expansion layer data". Each of the base layer data and the fixed layer data is data specifying channels to be assigned to the eight channel strips of the channel strip portion. A piece of base layer data is always arranged in the base layer. Layer data may or not may be arranged in respective ones of the fixed layer and the expansion layer. A plurality of layer data is prepared (or stored) for each layer for layer data setting. Layer data for setting in a layer cannot be used for a different layer. For example, base layer data may be set only in a base layer and cannot be set in a different layer such as a fixed layer.

The following is a description of the base layer. The base layer is a basic layer for assignment of channels to channel strips of the channel strip portion in the mixer and is typically used to assign channels to the channel strips in order of channel type or number. For example, base layer data 1 specifying that the input channels 1 to 8 are assigned to the eight channel strips in order from the left, base layer data 2 specifying that the input channels 9 to 16 are assigned to the eight channel strips in order from the left, etc., are factory preset and prepared as base layer data arranged in the base layer. In this mixer, all channels (for example, input channels, output channels, or the like) that can be adjusted by the user are always included in some of the prepared base layer data. In addition, it is assumed that one piece of base layer data always specifies channels assigned to all eight channel strips of one channel strip portion.

Special base layer data includes custom layer data and DCA layer data. The custom layer data is layer data composed by the user. That is, the user may arbitrarily compose custom layer data that specifies assignment of channels to channel strips of a channel strip portion. A region for storing custom layer data is provided in the current memory. The custom layer data may also include a channel strip to which no channel has been assigned. When custom layer data arranged in the base layer includes a channel strip to which no channel has been assigned, an assignment channel of layer data that has been immediately previously arranged in the base layer continues to be arranged for the channel strip. The DCA layer data is layer data that specifies DCA groups assigned to channel strips of a channel strip portion and is used to collectively control a plurality of channels belonging to one DCA group through one channel strip. Here, since the channel strip portion includes eight channel strips, DCA groups 1 to 8 are prepared for the eight channel strips. A plurality of channels, which the user has arbitrarily selected as channels that the user desires to collectively control, may be registered in each DCA group. A region for storing DCA layer data is provided in the current memory. The DCA layer data is layer data specifying, for example, that DCA groups 1 to 8 are assigned to the eight channel strips in order from the left to the right.

While the DCA group provides a function to group and control a plurality of channels in a base layer through one channel strip as described above, a "channel set group" also provides the same function. The channel set group is a group of channels that the user has arbitrarily selected. When the user composes custom layer data or fixed layer data that is described below, the user may assign the channel set group to one arbitrary channel strip. For example, when the user desires to group and cooperatively control two channels corresponding to left and right stereo channels or a plurality of channels corresponding to 5.1 surround channels through a single channel strip, the two channels or the plurality of channels are grouped into a single channel set group and the channel set group is assigned to the single channel strip.

In addition, one channel or one group (one DCA group or one channel set group) is arranged for one channel strip in the base layer or the fixed layer that is described later. Further, assignment channel specification in the base layer data or the fixed layer data that is described later is specified such that one channel or one group is arranged in one channel strip.

Software (or virtual) controls or parameter indicators associated with a plurality of channels of a DCA group or a channel set group assigned to a channel strip are displayed in a channel parameter display region that is displayed above the channel strip.

Referring back to FIG. 3, reference numeral "312" denotes a plurality of switches for selecting base layer data to be arranged in the base layer of the channel strip portion 304. These switches are referred to as "base switches" and are respectively referred to as "switches B1 to Bn". Each of the switches B1 to Bn is associated with base layer data. For example, the switch B1 is associated with the base layer data 1 described above, the switch B2 is associated with the base layer data 2 described above, . . . , and the switch Bn is associated with base layer data n. In this case, when the switch B1 is turned on, the base layer data 1 is arranged (namely, selected and set) in the base layer of the channel strip portion 304. The switches B1 to Bn include a switch for arranging custom layer data in the base layer and a switch for arranging DCA layer data in the base layer.

The following is a description of the fixed layer. The fixed layer is typically used to fix a desired channel, which the user desires to always monitor or desires to frequently adjust, to a desired channel strip. The user may freely compose fixed layer data that specifies assignment of channels to channel strips of a channel strip portion. The specification of the fixed layer data may also include a channel strip to which no channel is assigned. For example, when the user desires to fixedly manipulate the input channel 22 through the channel strip 1 in the case where vocals have been assigned to the input channel 22, the user composes fixed layer data specifying that the input channel 22 is assigned to the channel strip 1 and no channels are assigned to the other channel strips 2 to 8, and then arranges the fixed layer data in the fixed layer. While the fixed layer data and the custom layer data described above have a common feature that the user can arbitrarily specify assignment of channels, the fixed layer data and the custom layer data are arranged in different layers. As described above, when fixed layer data is composed, one channel set group may be assigned as one assignment unit to one channel strip.

In FIG. 3, reference numeral "313" denotes three switches for selecting fixed layer data to be arranged in the fixed layer of the channel strip portion 304. These switches are referred to as "fix switches" and are respectively referred to as "switches FIX1 to FIX3". The switches FIX1 to FIX3 are associated with fixed layer data 1 to 3, respectively. For example, when the switch FIX1 is turned on, the fixed layer data 1 is arranged (namely selected and set) in the fixed layer of the channel strip portion 304. The fixed layer data 1 to 3 are previously composed by the user and a channel set group may be used for the fixed layer data as described above.

The following is a description of the expansion layer. It is possible to collectively control a plurality of channels using a DCA group or a channel set group described above. However, the user may temporarily desire to individually manipulate each of the plurality of channels of the group. Therefore, the mixer has a function to expand and assign the plurality of grouped channels to individual channel strips to allow the user to individually manipulate the channels. A layer for expanding and assigning the plurality of grouped channels to channel strips is referred to as an expansion layer.

Reference numeral "314" of FIG. 3 denotes an expansion switch for instructing expansion of a plurality of grouped channels. The user can instruct expansion of a group including a plurality of channels such as a DCA group or a channel set group by depressing the expansion switch 314. Here, it is assumed that the group to be expanded has been designated (using an arbitrary designation method) before the expansion switch 314 is depressed. When the expansion switch 314 is depressed, the mixer composes expansion layer data specifying that the channels of the designated group are individually assigned to channel strips and arranges the expansion layer data in the expansion layer data region. For example, when a DCA group 1, into which the input channels 1 to 5 are grouped, is designated and an expansion instruction is issued, expansion layer data, which specifies that the input channels 1 to 5 are assigned to the eight channel strips in order from the left, is composed and arranged in the expansion layer data region. The specification of the expansion layer data may also include a channel strip to which no channel is assigned. The expansion layer data may be generated such that the expansion layer data arbitrarily specifies channel strips to which the plurality of grouped channels are assigned. However, it is assumed here that the expansion layer data specifies that the plurality of grouped channels is assigned to the channel strips in order of increasing (ascending) channel number from the left channel strip.

The following is a description of the "assignment process". The current memory includes, for each channel strip portion, an assignment channel storage region that stores a channel (assignment channel) that is actually assigned to each channel strip of the channel strip portion. The assignment process is a process for setting channels (assignment channels) that are to be manipulated respectively by the channel strips of the channel strip portion using layer data arranged in each of the three layer data regions. However, there may be a state in which layer data is not arranged in the fixed layer data region and the expansion layer data region. Specifically, the assignment process is a process for determining respective assignment channels (i.e., assignment states of channels) of channel strips based on layer data arranged in each layer and storing the assignment channels in assignment channel storage regions in the current memory corresponding to the channel strips of the channel strip portion according to the determined assignment states. The assignment process is performed on all channel strips of the channel strip portion when initial setting is performed when the mixer 100 is powered on and when layer data of one of the three layers in the current memory corresponding to the channel strip portion has been changed. All layer data arranged for each layer of the channel strip portion is used for the assignment process. If a control of a channel strip is manipulated (or when a software control displayed in a channel parameter display region corresponding to a channel strip is manipulated) after the assignment process is performed such that assignment channels are stored in assignment channel storage regions in the current memory, an assignment channel stored in an assignment channel storage region in the current memory corresponding to the channel strip is determined as a channel to be manipulated through the channel strip. In the case where a plurality of channels belonging to a DCA group or a channel set group is stored in the assignment channel storage region in the current memory corresponding to the manipulated channel strip, the plurality of channels are determined as channels to be manipulated through the channel strip such that the plurality of channels is collectively controlled through the channel strip.

The following is a description of relationships between the three layers. Conceptually, the base layer is located at the bottom of hierarchal, the fixed layer is located above the base layer, and the expansion layer is located above the fixed layer. That is, first, basic assignment of channels to channel strips is performed based on base layer data arranged in the base layer. However, when fixed layer data has been arranged in the fixed layer, priority is given to assignment channels based on the fixed layer data (i.e., assignment channels based on the base layer data are overwritten with assignment channels based on the fixed layer data) and, when expansion layer data has been arranged in the expansion layer, priority is given to assignment channels based on the expansion layer data (i.e., assignment channels based on the base and fixed layer data are overwritten with assignment channels based on the expansion layer data). Here, assignment channels based on the base layer data which is lower than the fixed layer data are applied to channel strips to which no channels are assigned according to the fixed layer data. In addition, assignment channels based on the fixed layer data which is lower than the expansion layer data are applied to channel strips to which no channels are assigned according to the expansion layer data. Here, when no channels are assigned to the channel strips according to the fixed layer data, assignment channels based on the base layer data which is lower than the fixed layer data are applied to the channel strips. The expansion layer or the fixed layer above the base layer is treated as transparent for channel strips that are not assigned any channels.

Specifically, when the assignment process is performed, first, assignment channels specified in base layer data stored in a base layer data region of the channel strip portion in the current memory are copied to assignment channel storage regions in the current memory and then assignment channels of channel strips, for which the assignment channels have been specified in fixed layer data stored in a fixed layer data region of the channel strip portion in the current memory, are overwritten to assignment channel storage regions corresponding to the channel strips in the current memory and then assignment channels of channel strips, for which the assignment channels have been specified in expansion layer data stored in an expansion layer data region of the channel strip portion in the current memory, are overwritten to assignment channel storage regions corresponding to the channel strips in the current memory. For a channel strip for which no assignment channel has been specified in the fixed layer data, the assignment channel stored in the assignment channel storage region is not overwritten when the fixed layer process is performed. In addition, for a channel strip for which no assignment channel has been specified in the expansion layer data, the assignment channel stored in the assignment channel storage region is not overwritten when the expansion layer process is performed. In summary, the assignment process is performed by giving priority to a channel indicated in layer data arranged in a higher layer over a channel indicated in layer data arranged in a lower layer.

Figure 4:
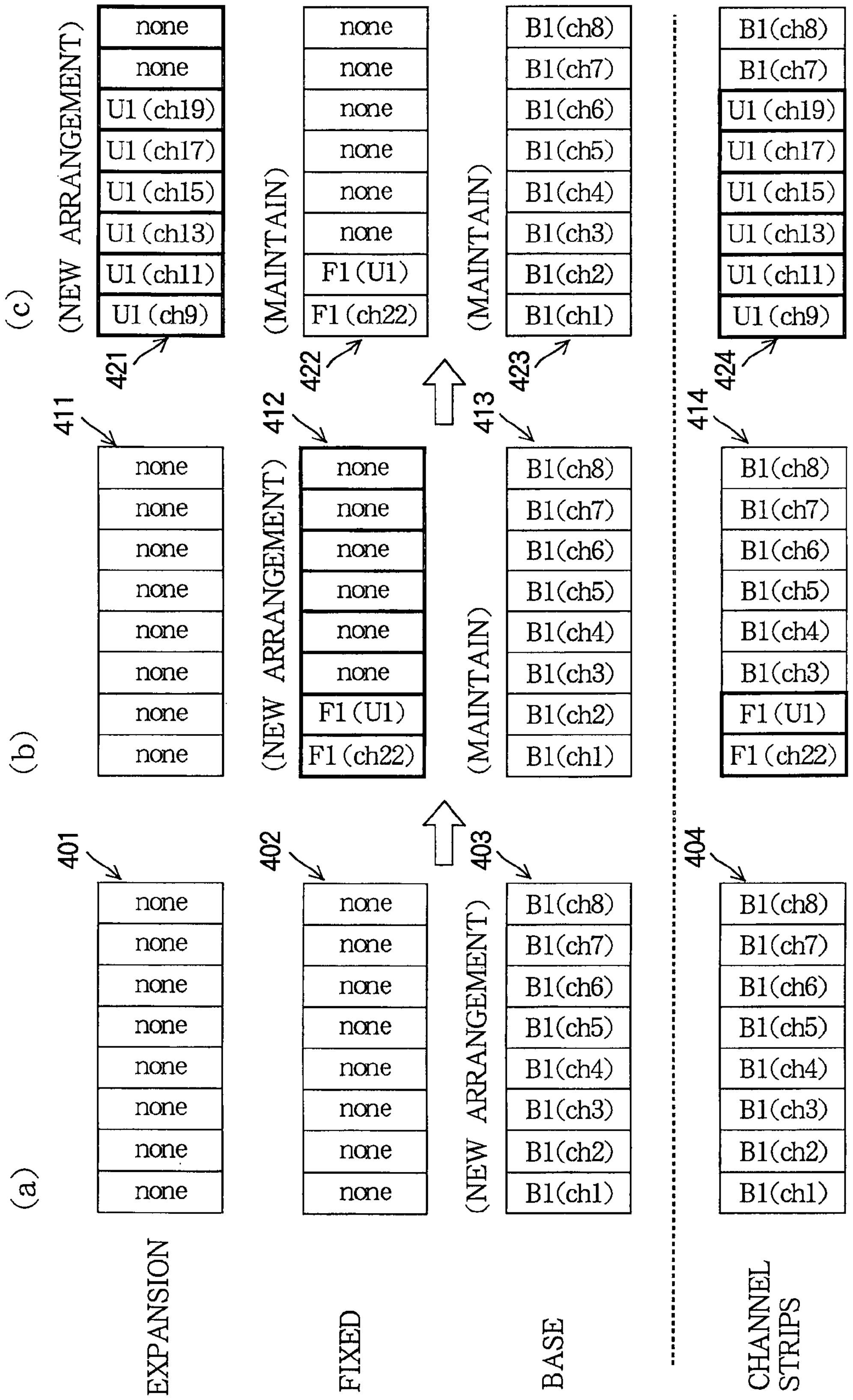
FIG. 4 illustrates a data structure of three layers configured in the digital mixer.

FIG. 4 illustrates the three layers. In FIG. 4, part (a), reference numerals "401", "402", and "403" indicate data (current data) set in the expansion layer data region, the fixed layer data region, and the base layer data region in the current memory, respectively. As shown in FIG. 4, each of the layer data regions is divided into eight rectangles which correspond to a row of eight channel strips. In FIG. 4, label "none" indicates that no assignment channel has been specified for a corresponding channel strip. In FIG. 4, part (a), "none" is set in all channel strips in an expansion layer data region 401 and a fixed layer data region 402 since no layer data has been arranged in the expansion layer data region 401 and the fixed layer data region 402. The base layer data 1 described above is arranged in the base layer data region 403. Reference numeral "404" indicates data (current data) stored in the assignment channel storage regions in the current memory when the assignment process has been performed based on the current data 401 to 403 of the layers. Since expansion layer data and fixed layer data have not been arranged, channel assignment states are determined based solely on the base layer data such that the input channels 1 to 8 are assigned to the channel strips 1 to 8 which are referred to as "channel strips 1 to 8" in order from the left.

Here, let us assume that new fixed layer data is arranged by turning the switch FIX1 on in the state of FIG. 4, part (a). FIG. 4, part (b) illustrates the resulting state. Here, the state of arrangement of no expansion layer data is not changed (411). Reference numeral "412" denotes current data in the fixed layer data region that has been newly arranged. The arranged fixed layer data is data specifying that the input channel 22 is assigned to the channel strip 1, a channel set group U1 is assigned to the channel strip 2, and no channels are assigned to the other channel strips 3 to 8. The channel set group U1 is a group of the input channels 9, 11, 13, 15, 17, and 19. Current data 413 of the base layer is kept unchanged from the current data 403 without being rewritten. Reference numeral "414" indicates current data stored in the assignment channel storage regions in the current memory when the assignment process has been performed based on the current data 411 to 413 of the layers. In this assignment process, since expansion layer data has not been arranged and priority is given to assignment based on current data in the fixed layer which is located above the base layer, assignment is performed based on fixed layer data for channel strips (i.e., channel strips 1 and 2) for which assignment channels have been specified in the fixed layer. In addition, assignment channels specified in base layer data which is immediately below the fixed layer data are assigned to channel strips (channel strips 3 to 8) for which no assignment channels have been specified in the fixed layer. Accordingly, the input channel 22 is assigned to the channel strip 1, the channel set group U1 is assigned to the channel strip 2, and channels specified in the base layer data are assigned to the channel strips 3 to 8.

Here, let us assume that an instruction to designate and expand the channel set group U1 has been issued in the state of FIG. 4, part (b). FIG. 4, part (c) illustrates the resulting state. Examples of a configuration in which a group to be expanded is designated include a configuration in which the user designates a group to be expanded by depressing a selection switch in a channel strip to which the group to be expanded has been assigned and a configuration in which a list of various groups recorded in the mixer is presented to the user and the user designates a desired group from the list. Reference numeral "421" denotes current data in the expansion layer data region that has been newly arranged. The arranged expansion layer data is data specifying that the input channels 9, 11, 13, 15, 17, and 19 of the designated channel set group U1 are assigned respectively to the channel strips 1 to 6 in order from left and no channels are assigned to the other channel strips 7 and 8. Current data 422 and 423 of the fixed layer and the base layer are kept unchanged from the current data 412 and 413 without being rewritten. Reference numeral "424" indicates current data stored in the assignment channel storage regions in the current memory when the assignment process has been performed based on the current data 421 to 423 of the layers. In this assignment process, since highest priority is given to the expansion layer data 421 which is highest layer data, first, the six input channels of the channel set group U1 are sequentially assigned to the channel strips 1 to 6. In addition, channels 7 and 8 specified in the base layer data 423 are assigned to the channel strips 7 and 8 since no channels have been assigned to the channel strips 7 and 8 in both the expansion layer data 421 and the fixed layer data 422.

Heavy-line frames in FIG. 4 indicate current data which has been changed from the previous state. The same is true for FIGS. 6, 8, 10, and 12 described later. As described above, the digital mixer 100 is an audio signal processing apparatus for performing audio signal process composed of a plurality of channels each having parameters used in the audio signal process. The audio signal processing apparatus has a plurality of channel strips 304, each channel strip 304-1 being assigned with a channel and being provided with controls 106 for adjusting values of the parameters of the assigned channel. Further, the audio signal processing apparatus has a plurality of storing sections in the form of a base layer, a fixed layer and an expansion layer having different priorities relative to each other, each storing section being capable of storing a setting (401-403) indicative of a channel set to a channel strip for assignment thereto. In the audio signal processing apparatus, a changing section is provided in the form of switches 312-314 for changing a setting stored in a storing section. An assigning section implemented by CPU 101 is activated when a setting stored in one of the plurality of the storing sections is changed by the changing section, then refers to all of the storing sections that currently store the settings for a channel strip, and assigns a channel to the channel strip according to the setting stored in a storing section having the highest priority among the storing sections referred to by the assigning section.

The assignment process is performed in the above manner. However, inconvenience may be caused if, when an instruction to change layer data of each layer has been issued, the assignment process is performed in a state in which only the instructed layer data has been changed. For example, when layer data of a layer lower than the expansion layer which is the highest layer is changed in a state in which expansion layer data has been arranged in the expansion layer, the changed layer data is not immediately applied to the actual channel strips since channel assignment to the channel strips is performed by giving highest priority to assignment based on the expansion layer data. If the user has changed layer data of a layer lower than the expansion layer in a state in which expansion layer data has been arranged in the expansion layer, it may be assumed that the user intends to use assignment of the changed layer data. Preventing the changed layer data from being applied regardless of such intension causes inconvenience. To eliminate such inconvenience, it may be considered that a layer higher than a specific layer is merely cleared (such that no layer data is arranged in the higher layer) when new layer data has been arranged in the specific layer. However, this may cause channels to be assigned to the channel strips differently than intended by the user. For example, layer data arranged in the expansion layer and the fixed layer are cleared if the user changes layer data of the base layer in a state in which the layer data has been arranged in each layer. However, in this case, the user typically has an intention to clear the layer data of the expansion layer that has been temporarily used, without clearing the layer data of the fixed layer which has been fixedly used, and to apply the current layer data of the fixed layer and the newly arranged layer data of the base layer to the channel strips. Thus, clearing up to the layer data of the fixed layer is contrary to the intention of the user, causing inconvenience.

Therefore, in the mixer, when new layer data is arranged in one of the three layers, layer data of each layer above the layer is controlled according to (the type of) the layer in which the new layer data is arranged. That is, first, when fixed layer data has been arranged, layer data of the expansion layer higher than the fixed layer is cleared and the assignment process is re-performed. Accordingly, the layer data of the fixed layer newly arranged by the user is immediately applied to the channel strips. In addition, when base layer data has been arranged, layer data of the expansion layer higher than the base layer is cleared while layer data of the fixed layer remain unchanged without being cleared and then the assignment process is re-performed. Accordingly, assignment channels specified in the fixed layer remain assigned to the channel strips according to the user's intention to always use the fixed layer and assignment channels of the newly arranged base layer data are immediately applied to channel strips for which no assignment channels have been specified in the fixed layer.

Figure 5:
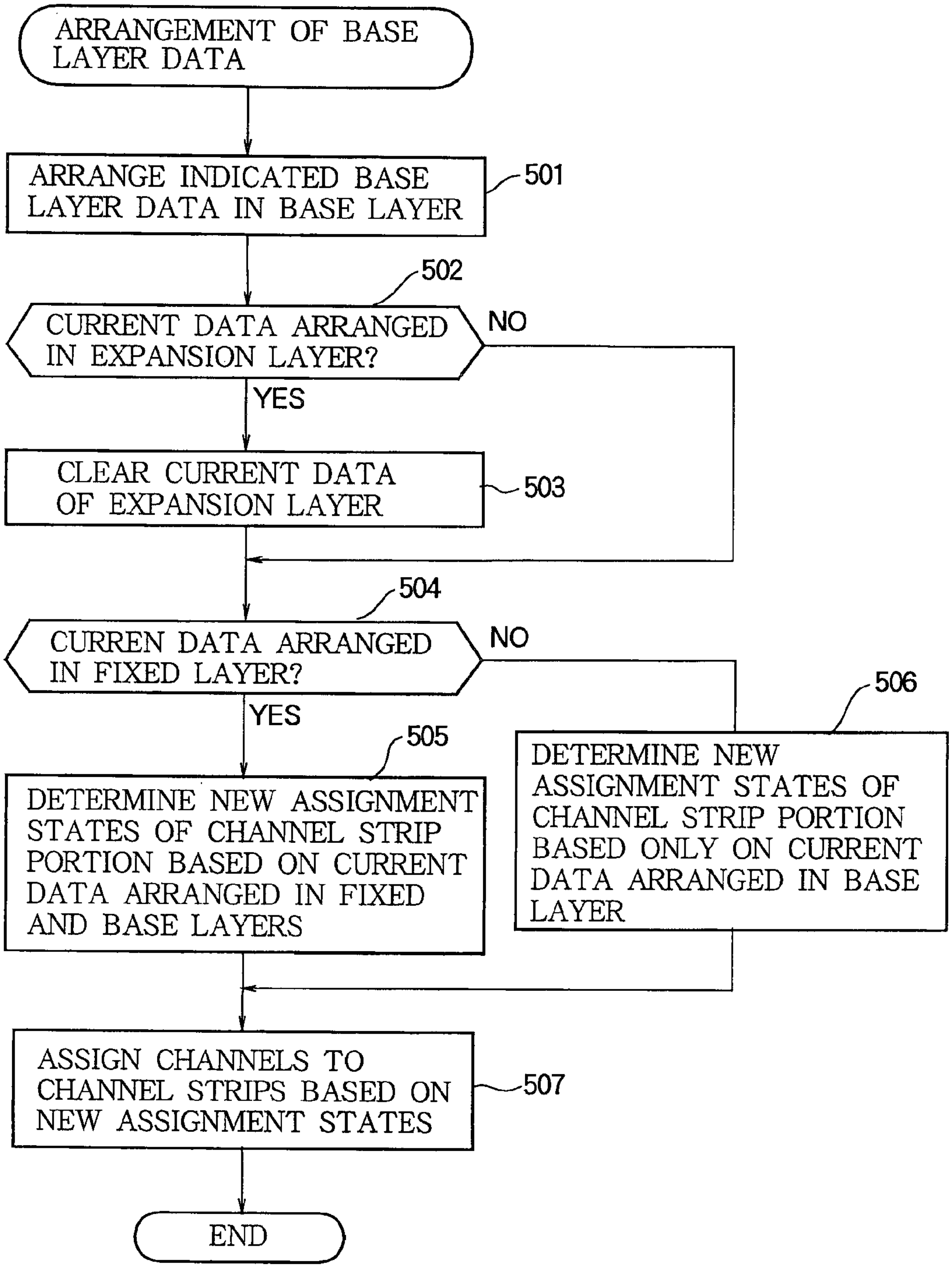
FIG. 5 is a flow chart illustrating a procedure for arranging base layer data.

FIG. 5 is a flow chart illustrating a procedure (arrangement procedure) that the CPU 101 performs to arrange base layer data. This procedure is activated when a base switch has been manipulated (i.e., when an instruction to arrange new base layer data has been detected). When a base switch is manipulated, base layer data and a channel strip portion corresponding to the manipulated base switch are specified and corresponding information is applied to this procedure.

In step 501, the specified base layer data is arranged in a base layer of the specified channel strip portion. That is, the base layer data is written as current data to a base layer data region of the channel strip portion in the current memory (i.e., assignment channels specified by the base layer data are written to the base layer data region). Reference numeral "403" in FIG. 4, part (a) indicates a state in which base layer data has been newly arranged in the base layer. In step 501, in the case where different base layer data has already been arranged in the base layer data region, the new base layer data is arranged in the base layer data region, overwriting the different base layer data. Here, it is assumed that, in the case where custom layer data, which includes a channel strip to which no channel is assigned, has been arranged in the base layer, an assignment channel of layer data that has been immediately previously arranged in the base layer continues to be arranged for the channel strip. In step 502, it is determined whether or not current data has been arranged in the expansion layer data region of the channel strip portion in the current memory. Upon determining that current data has been arranged in the expansion layer data region, the current data is removed from the expansion layer (i.e., the expansion layer is cleared) in step 503. Upon determining that current data has not been arranged in the expansion layer data region, step 503 is skipped. That is, the expansion layer is brought into the state "401" of FIG. 4, part (a).

Whether or not current data has been arranged in the fixed layer data region of the channel strip portion in the current memory is determined in step 504. In the state "402" of FIG. 4, part (a), current data has not been arranged in the fixed layer data region. Upon determining that current data has been arranged in the fixed layer data region, in step 505, new assignment states of the channel strip portion are determined according to the current data arranged in each of the fixed layer data region and the base layer data region of the channel strip portion in the current memory. Next, in step 507, channels are assigned to the channel strips according to the new assignment states. In the case where the assignment states of the channel strip portion 304 have changed, display of the region 302 is also updated according to the new assignment channels. Upon determining in step 504 that current data has not been arranged in the fixed layer data region, in step 506, new assignment states of the channel strip portion are determined based only on current data arranged in the base layer data region and the procedure then proceeds to step 507. Through the procedure of steps 501→502→504→506→507, the current data of the assignment channel storage regions is set as indicated by reference numeral "404" in FIG. 4, part (a). The procedure of steps 504 to 507 corresponds to the assignment process described above.

Figure 6:
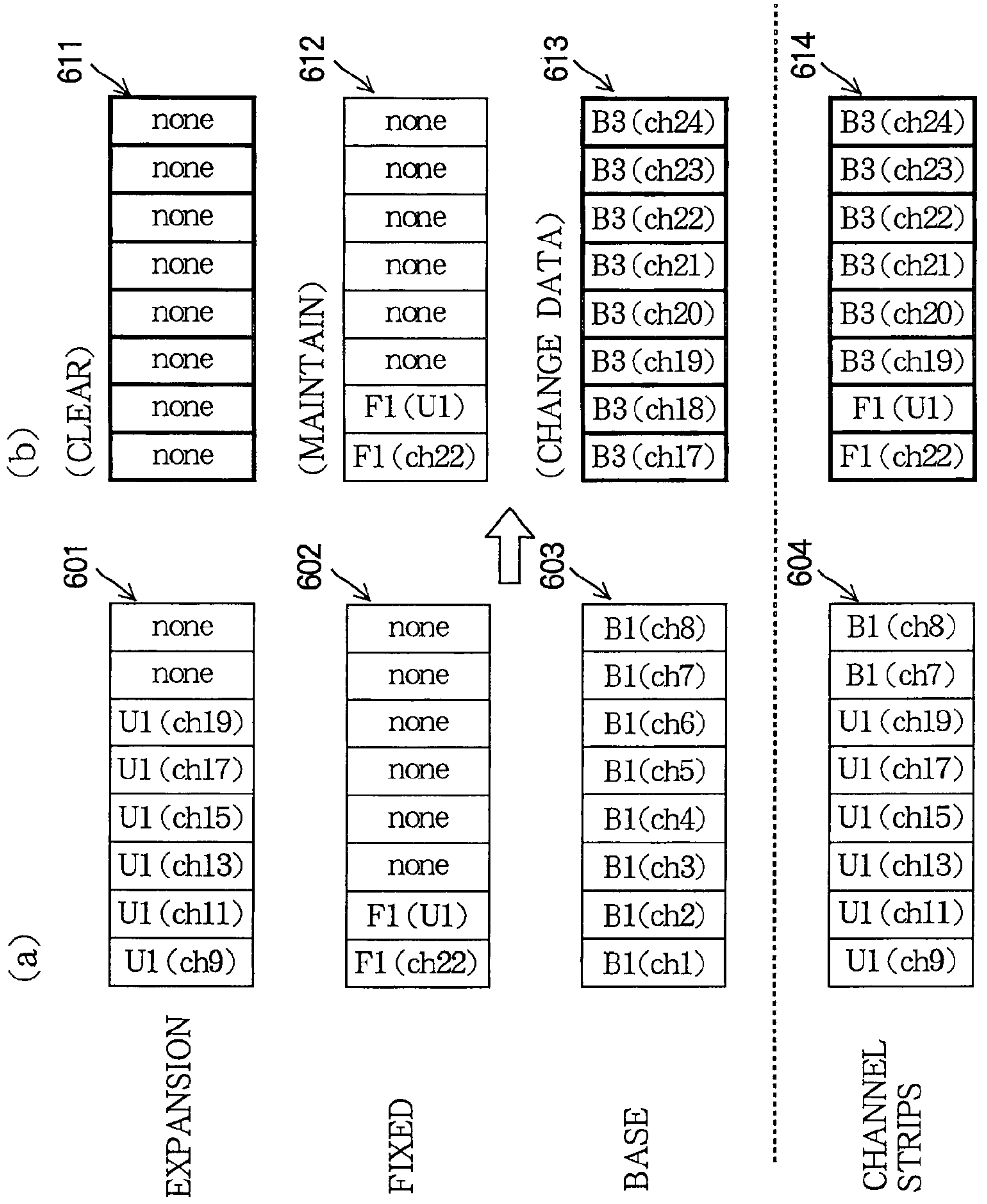
FIG. 6 illustrates exemplary change of a base layer.

FIG. 6 illustrates an example in which a base layer is changed through the procedure of FIG. 5. FIG. 6, part (a) shows the same state as FIG. 4, part (c). Specifically, base layer data selected by the switch B1 is arranged as current data of the base layer (603), fixed layer data selected by the switch FIX1 is arranged as current data of the fixed layer (602), and expansion layer data created by expanding the channel set group U1 is arranged as current data of the expansion layer (601). Reference numeral "604" denotes an assignment state at this time. Here, let us assume that the procedure of FIG. 5 has been performed by turning the switch B3 on in the state of FIG. 6, part (a). FIG. 6, part (b) illustrates a state after the procedure of FIG. 5. Although the current data of the base layer has been changed as indicated by reference numeral "613" through step 501 of FIG. 5, the current data 612 of the fixed layer is the same as the current data 602 since the change of the current data of the base layer does not affect the fixed layer. However, through the procedure of steps 502→503, the expansion layer is cleared to be brought into a state indicated by reference numeral "611". Reference numeral "614" denotes current data of the assignment channel storage regions in the current memory when the assignment process has been performed based on the current data 613 and 612 of the base layer and the fixed layer through the procedure of steps 504→505→507. The channel 22 and the channel set group U1 specified in the fixed layer data are assigned to the channel strips 1 and 2 and channels specified in the new base layer data are assigned to the remaining channel strips 3 to 8. Accordingly, it is possible to switch channels assigned to channel strips, which have no assignment channels in the fixed layer, to new assignment channels of the base layer while fixedly using assignment channels specified in the fixed layer without remaining assignment channels of the expansion layer which has been temporarily expanded and used.

As described above, a clearing section of the digital mixer 100 is implemented by CPU 101 as step 503 of FIG. 5 and automatically or forcibly clears a first setting (e.g., expansion layer data 601) stored in a first one (e.g., expansion layer) of the plurality of the storing sections provided in the current memory, when a changing section 312 of the digital mixer changes a second setting (e.g., base layer data 603) stored in a second one (e.g., base layer) of the plurality of the storing sections, the second one (base layer) being different from the first one (expansion layer) of the storing sections.

Specifically, the clearing section automatically clears a first setting (expansion layer data 601) stored in a first one (expansion layer) of the plurality of the storing sections, the first one (expansion layer) having a higher priority than a second one (base layer) of the plurality of the storing sections, when the changing section changes a second setting (base layer data 603) stored in the second one (base layer) of the storing sections.

More specifically, the clearing section automatically clears a first setting (expansion layer data 601) stored in a first one (expansion layer) of the plurality of the storing sections, the first one (expansion layer) having the highest priority among the plurality of the storing sections (namely, expansion layer, fixed layer and base layer), when the changing section changes a second setting (base layer data 603) stored in a second one of the plurality of the storing sections, the second one (base layer) not having the highest priority.

Figure 7:
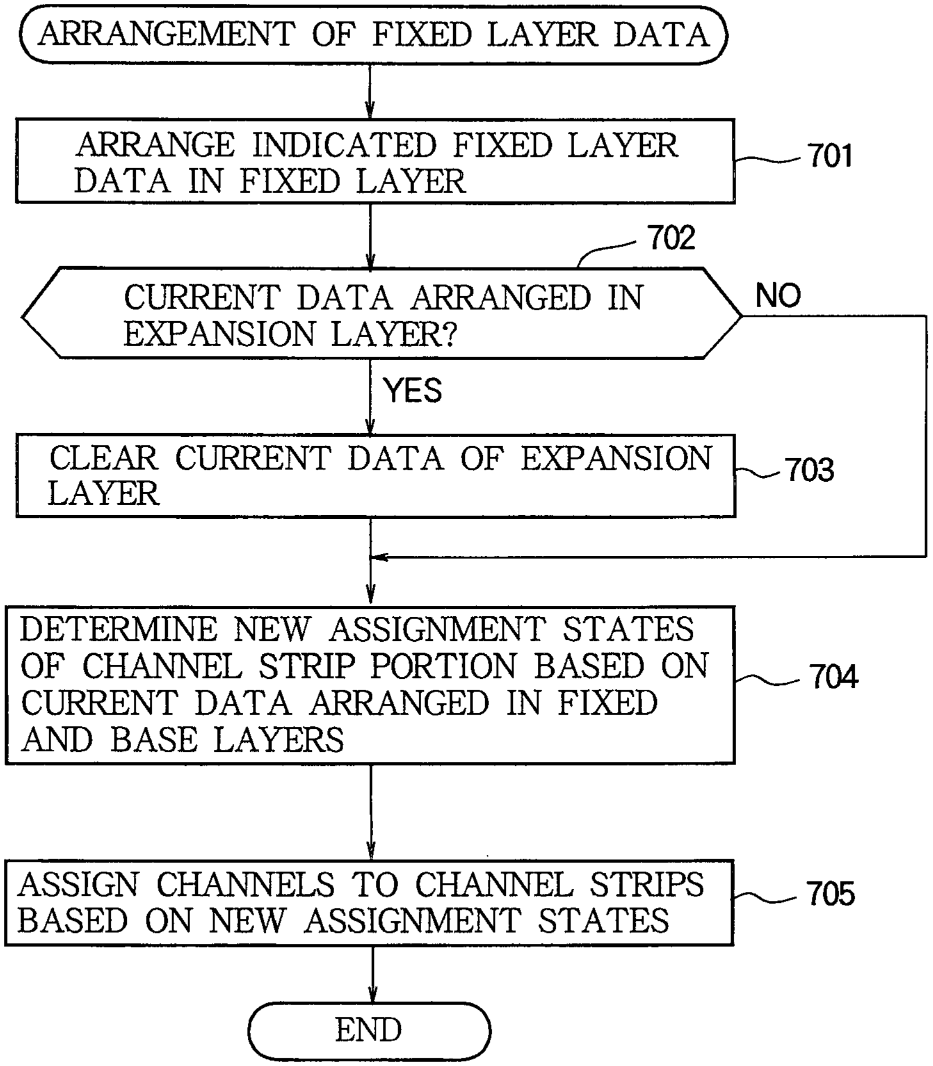
FIG. 7 is a flow chart illustrating a procedure for arranging fixed layer data.

FIG. 7 is a flow chart illustrating a procedure (arrangement procedure) that the CPU 101 performs to arrange fixed layer data. This procedure is activated when a fix switch has been manipulated (i.e., when an instruction to arrange new fixed layer data has been detected). When a fix switch is manipulated, fixed layer data and a channel strip portion corresponding to the manipulated fix switch are specified and corresponding information is applied to this procedure.

In step 701, the specified fixed layer data is arranged in a fixed layer of the specified channel strip portion. That is, the fixed layer data is written as current data to a fixed layer data region of the channel strip portion in the current memory. Reference numeral "412" in FIG. 4, part (b) indicates a state in which fixed layer data has been newly arranged in the fixed layer. In step 701, in the case where different fixed layer data has already been arranged in the fixed layer data region, the new fixed layer data is arranged in the fixed layer data region, overwriting the different fixed layer data. In step 702, whether or not current data has been arranged in the expansion layer data region of the channel strip portion in the current memory is determined. Upon determining that current data has been arranged in the expansion layer data region, the current data is removed from the expansion layer (i.e., the expansion layer is cleared) in step 703. Upon determining that current data has not been arranged in the expansion layer data region, step 703 is skipped. In step 704, new assignment states of the channel strip portion are determined according to the current data arranged in each of the fixed layer data region and the base layer data region of the channel strip portion in the current memory. Next, in step 705, channels are assigned to the channel strips according to the new assignment states. Through the procedure of steps 701→702→704→705, the current data of the assignment channel storage regions is set as indicated by reference numeral "414" in FIG. 4, part (b). In the case where the assignment states of the channel strip portion 304 have changed, display of the region 302 is also updated according to the new assignment channels. The procedure of steps 704 to 705 corresponds to the assignment process described above.

Figure 8:
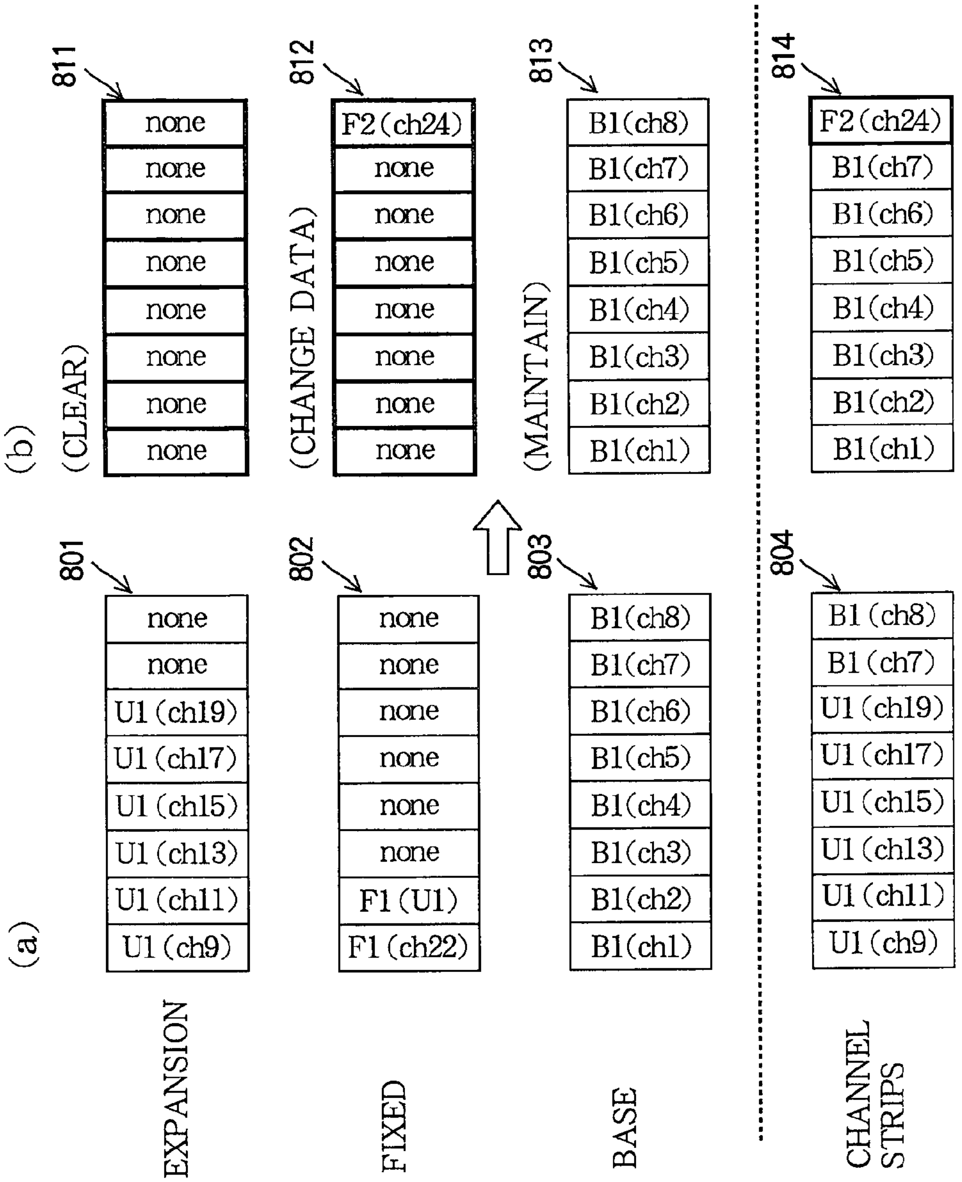
FIG. 8 illustrates exemplary change of a fixed layer.

FIG. 8 illustrates an example in which a fixed layer is changed through the procedure of FIG. 7. FIG. 8, part (a) shows the same state as FIG. 4, part (c). Specifically, base layer data selected by the switch B1 is arranged as current data of the base layer (803), fixed layer data selected by the switch FIX1 is arranged as current data of the fixed layer (802), and expansion layer data created by expanding the channel set group U1 is arranged as current data of the expansion layer (801). Reference numeral "804" denotes an assignment state at this time. Here, let us assume that the procedure of FIG. 7 has been performed by turning the switch FIX3 on in the state of FIG. 8, part (a). FIG. 8, part (b) illustrates a state after the procedure of FIG. 7. New fixed layer data 812 is arranged through the process of step 701 of FIG. 7. The fixed layer data 812 is data specifying that the input channel 24 is assigned to the channel strip 8 and no channels are assigned to the other channel strips 1 to 7. Since this change does not affect the base layer, the current data 813 of the base layer is the same as the current data 803. However, through the procedure of steps 702→703, the expansion layer is cleared to be brought into a state indicated by reference numeral "811". Reference numeral "814" denotes current data of the assignment channel storage regions in the current memory when the assignment process has been performed based on the current data 813 and 812 of the base layer and the fixed layer through the procedure of steps 704→705. The channel 24 specified in the fixed layer data 812 is assigned to the channel strip 8 and channels specified in the base layer data 813 are assigned to the channel strips 1 to 7. Accordingly, it is possible to maintain assignment channels of the base layer for channel strips which have no assignment channels in the new fixed layer while switching the other assignment channels to assignment channels specified in the new fixed layer without leaving assignment channels specified in the expansion layer which has been temporarily expanded and used.

As described above, a clearing section of the digital mixer 100 is implemented by CPU 101 as step 703 of FIG. 7 and automatically or forcibly clears a first setting (e.g., expansion layer data 801) stored in a first one (expansion layer) of the plurality of the storing sections provided in the current memory, when a changing section 313 of the digital mixer changes a second setting (fixed layer data 802) stored in a second one (fixed layer) of the plurality of the storing sections, the second one (fixed layer) being different from the first one (expansion layer) of the storing sections.

Specifically, the clearing section automatically clears a first setting (expansion layer data 801) stored in a first one (expansion layer) of the plurality of the storing sections, the first one (expansion layer) having a higher priority than a second one (fixed layer) of the plurality of the storing sections, when the changing section changes a second setting (fixed layer data 802) stored in the second one (fixed layer) of the storing sections.

More specifically, the clearing section automatically clears a first setting (expansion layer data 801) stored in a first one (expansion layer) of the plurality of the storing sections, the first one (expansion layer) having the highest priority among the plurality of the storing sections (namely, expansion layer, fixed layer and base layer), when the changing section changes a second setting (fixed layer data 802) stored in a second one of the plurality of the storing sections, the second one (fixed layer) not having the highest priority.

Figure 9:
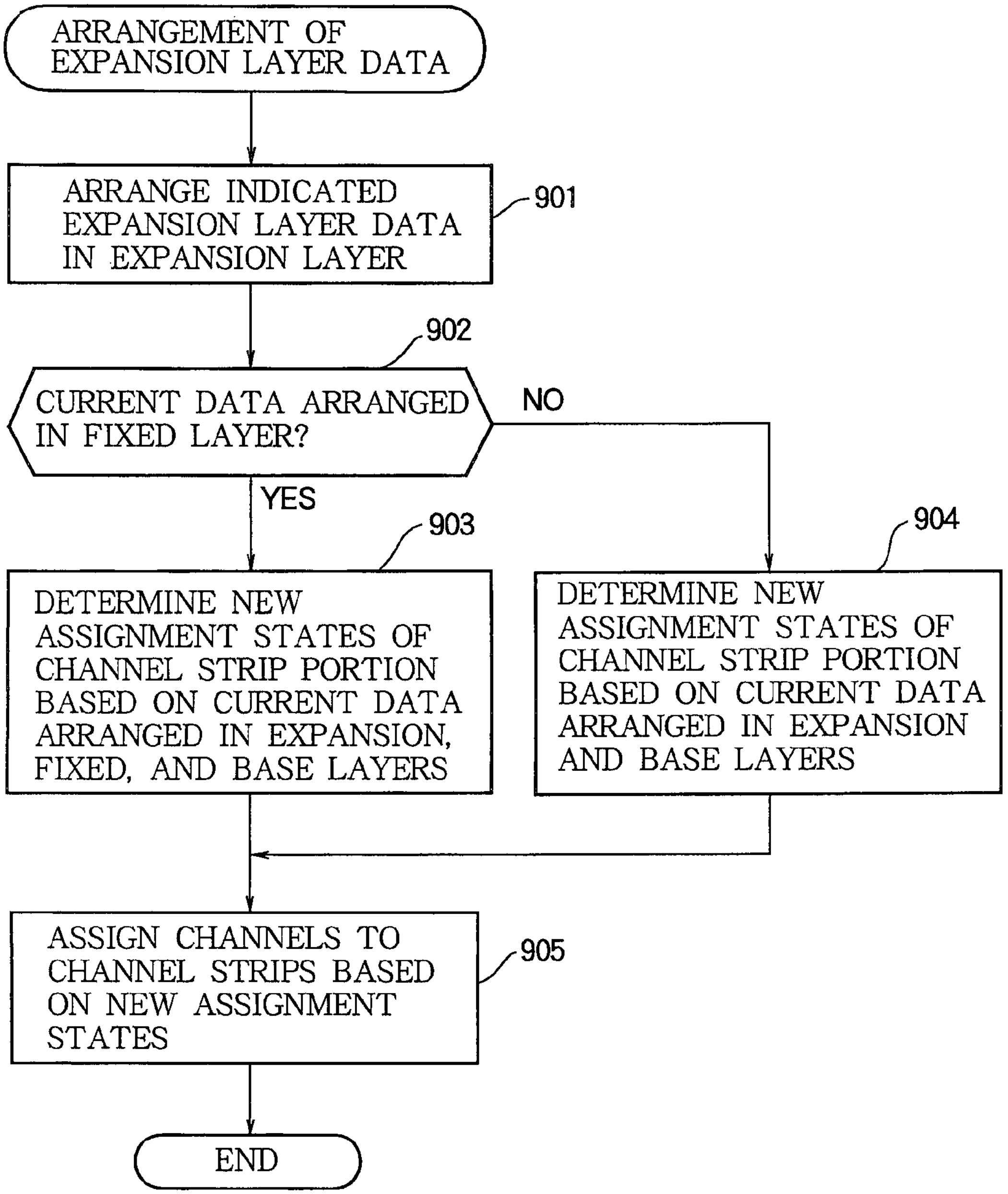
FIG. 9 is a flow chart illustrating a procedure for arranging expansion layer data.

FIG. 9 is a flow chart illustrating a procedure (arrangement procedure) that the CPU 101 performs to arrange expansion layer data. This procedure is activated when an expansion switch has been manipulated after or while a group is designated (i.e., when an instruction to arrange new expansion layer data has been detected). When an expansion switch is manipulated, a channel strip portion corresponding to the manipulated expansion switch and a group, expansion of which has been instructed, are specified and corresponding information is applied to this procedure.

In step 901, expansion layer data created by expanding a plurality of channels included in the specified group into individual channels is arranged in an expansion layer of the specified channel strip portion. Reference numeral "421" in FIG. 4, part (c) indicates a state in which expansion layer data has been newly arranged in the expansion layer. In the case where different expansion layer data has already been arranged in the expansion layer data region, the new expansion layer data is arranged in the expansion layer data region, overwriting the different expansion layer data. In step 902, whether or not current data has been arranged in the fixed layer data region of the channel strip portion in the current memory is determined. Upon determining that current data has been arranged in the fixed layer data region, the procedure proceeds to step 903. In step 903, new assignment states of the channel strip portion are determined according to the current data arranged in each of the expansion layer data region, the fixed layer data region, and the base layer data region of the channel strip portion in the current memory. Next, in step 905, channels are assigned to the channel strips according to the new assignment states. Through the procedure of steps 902→903→905, the current data of the assignment channel storage regions is set as indicated by reference numeral "424" in FIG. 4, part (c). In the case where the assignment states of the channel strip portion 304 have changed, display of the region 302 is also updated according to the new assignment channels. Upon determining in step 902 that current data has not been arranged in the fixed layer data region, in step 904, new assignment states of the channel strip portion are determined based on current data arranged in the expansion layer data region and the base layer data region, and the procedure then proceeds to step 905. As described above, when current data of the highest layer (the expansion layer in this embodiment) has been changed, the CPU 101 performs a control operation to maintain all current data of the other layers (i.e., so as not to clear current data of any of the layers). The procedure of steps 902 to 905 corresponds to the assignment process described above. As described above, a clearing section of the digital mixer does not clear any setting stored in any of the plurality of the storing sections (namely, expansion layer, fixed layer and base layer) as indicated by steps 903 and 904 of FIG. 9, when a changing section of the digital mixer changes the first setting (namely, when the changing section changes the expansion layer data as indicated by step 901 of FIG. 9) stored in the first one (namely, the expansion layer) of the storing sections having the highest priority.

Figure 10:
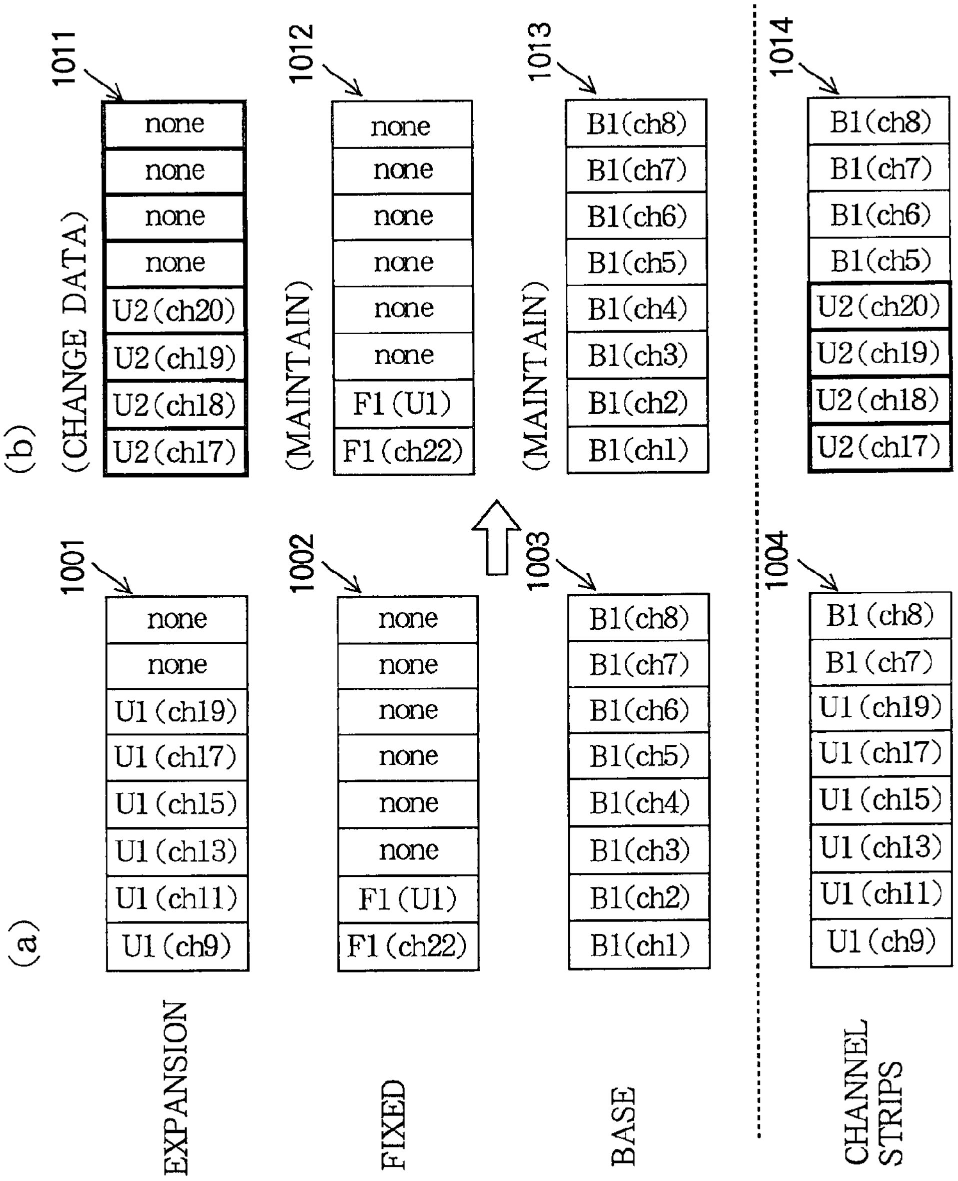
FIG. 10 illustrates exemplary change of an expansion layer.

FIG. 10 illustrates an example in which an expansion layer of a channel strip portion is changed through the procedure of FIG. 9. FIG. 10, part (a) shows the same state as FIG. 4, part (c). Specifically, base layer data selected by the switch B1 is arranged as current data of the base layer (1003), fixed layer data selected by the switch FIX1 is arranged as current data of the fixed layer (1002), and expansion layer data created by expanding the channel set group U1 is arranged as current data of the expansion layer (1001). Reference numeral "1004" denotes an assignment state at this time. Here, let us assume that the procedure of FIG. 9 has been performed by designating a channel set group U2 and turning the expansion switch on in the state of FIG. 10, part (a). FIG. 10, part (b) illustrates a state after the procedure of FIG. 9. Although the current data of the expansion layer has been changed as indicated by reference numeral "1011" through step 901 of FIG. 9, the current data 1013 of the base layer is the same as the current data 1003 and the current data 1012 of the fixed layer is the same as the current data 1002 since the change of the current data of the expansion layer does not affect the base layer and the fixed layer. Reference numeral "1014" denotes current data of the assignment channel storage regions in the current memory when the assignment process has been performed based on the current data 1011 to 1013 of the layers through the procedure of steps 902→903→905. Channels of the channel set group U2 specified in the new expansion layer data 1011 are assigned respectively to the channel strips 1 to 4 and no channels are assigned to the channel strips 5 to 8, which have no assignment channels in the expansion layer, according to the fixed layer data 1012 and the base layer data 1013. Accordingly, it is possible to apply assignment channels specified in new expansion layer data while maintaining assignment channels of the base layer and the fixed layer for channel strips which have no assignment channels in the expansion layer data.

The following is a description of layer release. The release switch 311 of FIG. 3 is a switch for issuing an instruction to clear current data arranged in the highest layer among layer data of the three layers of the channel strip portion 304. When the release switch 311 is depressed, the highest layer in which layer data is arranged is identified, (1) only the expansion layer is cleared if the highest layer is the expansion layer, (2) only the fixed layer is cleared if the highest layer is the fixed layer, and the assignment process is re-performed. If the highest layer in which layer data is arranged is the base layer, the current state of assignment of channels to channel strips is maintained without clearing the layer.

Figure 11:
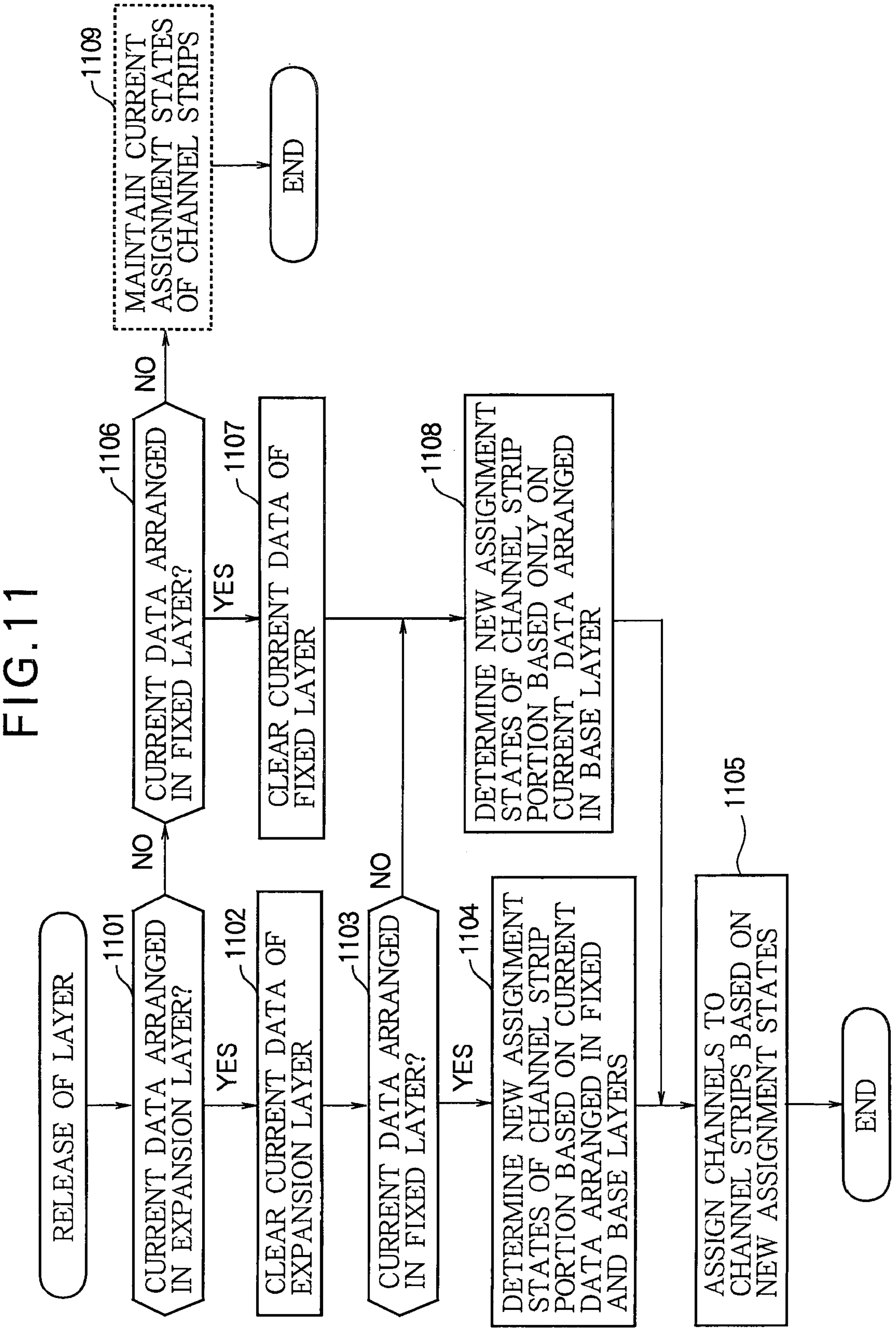
FIG. 11 is a flow chart illustrating a layer release procedure.

FIG. 11 is a flow chart illustrating a release procedure that is activated when a release switch is turned on. Information specifying a channel strip portion corresponding to the turned-on release switch is applied to this procedure.

In step 1101, whether or not current data has been arranged in an expansion layer data region of the channel strip portion in the current memory is determined. Upon determining that current data has been arranged in the expansion layer data region, the current data of the expansion layer data region is cleared in step 1102. Then, whether or not current data has been arranged in a fixed layer data region of the channel strip portion in the current memory is determined in step 1103. Upon determining that current data has been arranged in the fixed layer data region, in step 1104, new assignment states of the channel strip portion are determined according to the current data arranged in each of the fixed layer data region and the base layer data region of the channel strip portion in the current memory. Next, in step 1105, channels are assigned to the channel strips according to the new assignment states. In the case where the assignment states of the channel strip portion 304 have changed, display of the region 302 is also updated according to the new assignment channels.

Upon determining in step 1103 that current data has not been arranged in the fixed layer data region, in step 1108, new assignment states of the channel strip portion are determined based only on current data arranged in the base layer data region of the channel strip portion in the current memory and the procedure then proceeds to step 1105.

Upon determining in step 1101 that current data has not been arranged in the expansion layer data region, whether or not current data has been arranged in the fixed layer data region of the channel strip portion in the current memory is determined in step 1106. Upon determining that current data has been arranged in the fixed layer data region, the current data of the fixed layer data region of the channel strip portion in the current memory is cleared in step 1107 and the procedure proceeds to step 1108.

Upon determining in step 1106 that current data has been arranged in the fixed layer data region, the current state of assignment of channels to the channel strips of the channel strip portion remains unchanged in step 1109. The procedure of steps 1103 to 1105 corresponds to the assignment process described above.

Figure 12:
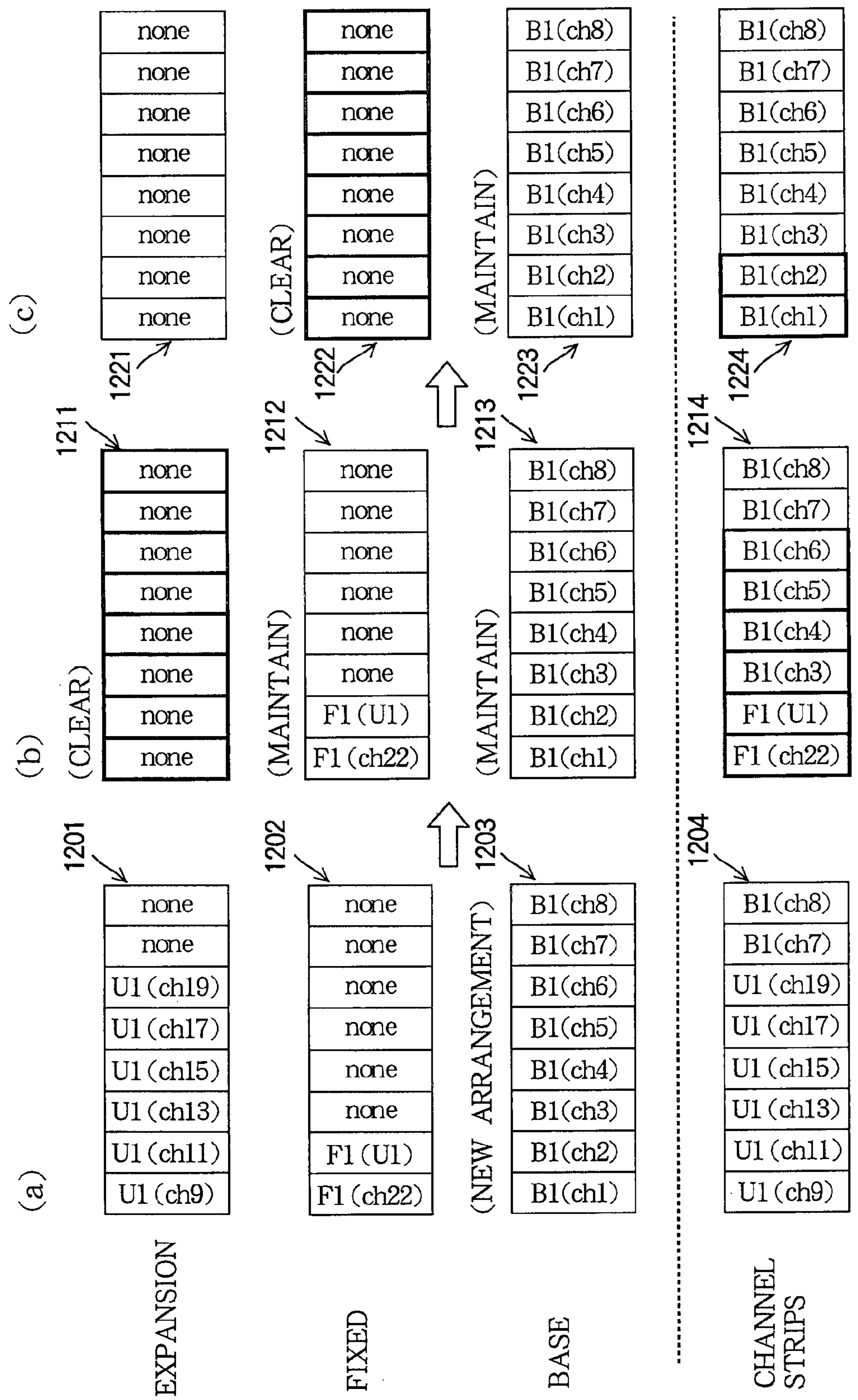
FIG. 12 illustrates exemplary layer release.

FIG. 12 illustrates exemplary layer release. FIG. 12, part (a) shows the same state as FIG. 4, part (c). Specifically, base layer data selected by the switch B1 is arranged as current data of the base layer (1203), fixed layer data selected by the switch FIX1 is arranged as current data of the fixed layer (1202), and expansion layer data created by expanding the channel set group U1 is arranged as current data of the expansion layer (1201). Reference numeral "1204" denotes an assignment state at this time.

Here, let us assume that the procedure of FIG. 11 has been performed by turning the release switch on in the state of FIG. 12, part (a). FIG. 12, part (b) illustrates a state after the procedure of FIG. 11. Through the procedure of steps 1101→1102, the expansion layer which is the highest layer among layers in which layer data is arranged is cleared to be brought into a state in which no expansion layer data is arranged as indicated by reference numeral "1211". States of the fixed layer and the base layer are not changed from states 1202 and 1203 as indicated by reference numeral "1212" and "1213". Reference numeral "1214" denotes current data of the assignment channel storage regions in the current memory when the assignment process has been performed based on the current data 1213 and 1212 of the base layer and the fixed layer through the procedure of steps 1103→1104→1105.

Here, let us assume that a new procedure of FIG. 11 has been performed by turning the release switch on again in the state of FIG. 12, part (b). FIG. 12, part (c) illustrates a state after the new procedure of FIG. 11. Through the procedure of steps 1101→1106→1107, the fixed layer which is the highest layer among layers in which layer data is arranged in FIG. 12, part (b) is cleared to be brought into a state in which no fixed layer data is arranged as indicated by reference numeral "1222". States of the expansion layer and the base layer are not changed from states 1211 and 1213 as indicated by reference numeral "1221" and "1223". Reference numeral "1224" denotes current data of the assignment channel storage regions in the current memory when the assignment process has been performed based on the current data 1223 of the base layer through the procedure of steps 1108→1105.

As described above, the digital mixer 100 according to the invention further includes an instructing section (release switch 311) that inputs a clearing instruction, and a detecting section implemented by CPU 101 (as steps 1101 and 1106 of FIG. 11) that detects one of the plurality of the storing sections (namely, expansion layer, fixed layer and base layer) in response to the clearing instruction, wherein the clearing section of the digital mixer is implemented by CPU 101 as steps 1102 and 1107 of FIG. 11 and clears the setting stored in the detected one of the storing sections. Specifically, the detecting section detects the storing section (expansion layer or fixed layer) which has a priority other than the lowest priority among the plurality of the storing sections (namely, expansion layer, fixed layer and base layer) and which has a highest priority among a group of storing sections that currently store the settings. In such a case, the clearing section does not clear any setting stored in any of the plurality of the storing sections (expansion layer, fixed layer and base layer) when the detecting section detects none of the storing sections in response to the clearing instruction.

In addition, it is possible that fixed layer data is not prepared in advance and a selected channel, i.e., an assignment channel assigned to a channel strip on which a selection (SEL) switch (which is provided on each channel strip) has been manipulated, is determined to correspond to an assignment channel specified in the fixed layer data and thus the assignment channel is arranged as current data in a fixed layer data region in the current memory. In this case, the fix switches on the manipulation panel are unnecessary and instead, for example, a switch or the like for issuing an instruction to switch on or off a mode for arranging the fixed layer is provided on the manipulation panel.

A second embodiment of the invention will now be described with reference to FIGS. 13 to 23.

Figure 13:
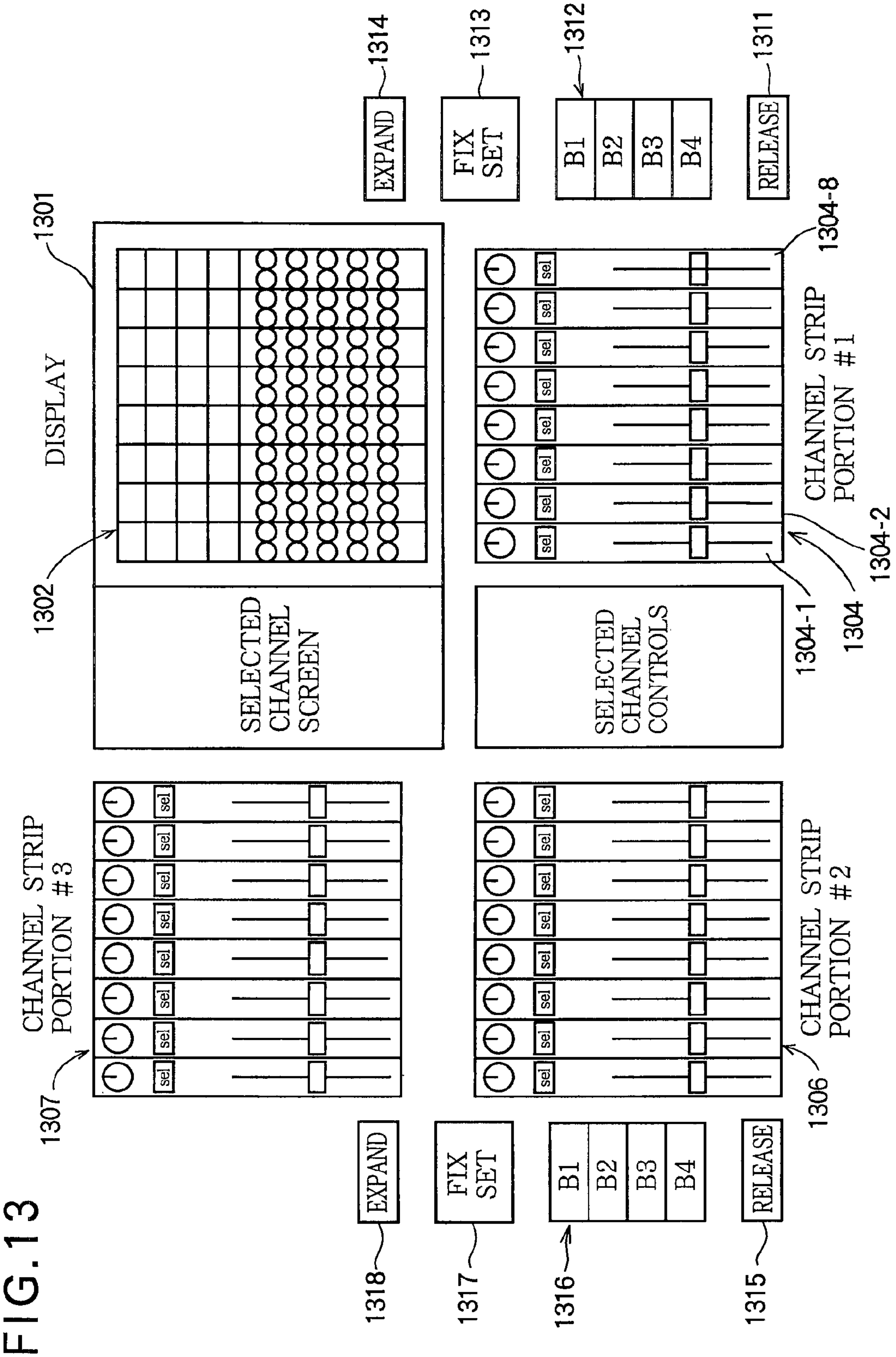
FIG. 13 illustrates an external appearance of a manipulation panel of a digital mixer according to a second embodiment of the invention.

FIG. 13 illustrates an external appearance of a manipulation panel of a digital mixer of the second embodiment. In the second embodiment, fixed layer data is not prepared in advance and an assignment channel assigned to a channel strip whose SEL switch has been manipulated is set as a channel specified in the fixed layer. The hardware configuration of the digital mixer of the second embodiment is similar to that of FIG. 1 and a block configuration for mixing processing is also similar to that of FIG. 2.

The components of the manipulation panel of FIG. 13 are similar to those of FIG. 3 and descriptions of reference numerals 1301, 1302, 1304, 1306, 1307, 1311, 1312, 1314, 1315, 1316, and 1318 will be omitted since they correspond to 301, 302, 304, 306, 307, 311, 312, 314, 315, 316, and 318. Although not explained in the description of the first embodiment, a SEL switch is provided on each channel strip of each of the channel strip portions 304, 306, 307, 1304, 1306, and 1307 (at a position below the rotary encoder in FIG. 3 and FIG. 13). A SEL switch is provided on each channel strip of each of the channel strip portions 1304, 1306, and 1307 (at a position below the rotary encoder in FIG. 13). In addition, while a plurality of fix switches 313 and 317 is provided in the first embodiment, fix set switches 1313 and 1317 for issuing an instruction to turn on or off a mode for setting a fixed layer (referred to as a "fix set mode") are provided in the second embodiment. For example, when the user desires to allocate the input channel 16 in the fixed layer in the channel strip portion 1304, first, the user turns on the switch B2 in the base switch 1312 to arrange the input channels 9 to 16 in the base layer with the fixed layer having been cleared, thereby assigning the input channel 16 to the channel strip 8 (a channel strip 1304-8 in FIG. 13). Then, the user depresses the fix set switch 1313 to turn the fix set mode on and then turns on the SEL switch of the channel strip 8 in the fix set mode. This corresponds to an instruction to arrange a channel currently assigned to the channel strip 8 in the fixed layer. Since the input channel 16 has been assigned to the channel strip 8, the input channel 16 is assigned to the fixed layer.

A channel strip to which an input channel is assigned in the fixed layer may be predetermined or may also be selected by the user. Here, it is assumed that input channels are assigned to the eight channel strips 1 to 8 in the fixed layer sequentially from the left to the right. Accordingly, in this example, the input channel 16 is assigned to the channel strip 1. In the case where SEL switches of a plurality of channel strips have been depressed in this fix set mode, channels are sequentially assigned to the subsequent channel strips 2, 3, . . . . Channel strips whose SEL switches are turned on are not limited to channel strips in a channel strip portion whose fix set mode has been turned on and such assignment may also be performed by turning on SEL switches of channel strips in another channel strip portion.

Then, the fix set switch 1313 is again depressed to turn the fix set mode on. Thereafter, the input channel 16 continues to be assigned to the channel strip 1 even when the base layer is switched. When the user desires to cancel assignment of the channel strip 1 in the fixed layer, the user may turn off the SEL switch of the channel strip 8 while the fix set mode is on. Here, it is assumed that an LED embedded in the switch has been turned on to indicate that the switch is on. In this case, it is assumed that, when assignments to the channel strips 2, 3, . . . of the fixed layer are present, the assignments are shifted to the left such that the previous assignments are changed to new assignments to the channel strips 1, 2, . . . .

While the expansion layer data region, the fixed layer data region, and the base layer data region are provided in the current memory, for example, as described above with reference to FIGS. 4, 6, 8, 10, and 12 in the first embodiment, only assignment channel storage regions are provided in the current memory and an expansion layer data region, a fixed layer data region, and a base layer data region are not provided in the current memory in the second embodiment. Instead, an expansion layer register, a fixed layer register, and a base layer register are provided as work registers. It is also possible to employ a configuration in which data regions corresponding to the expansion layer register, the fixed layer register, and the base layer register of the second embodiment are provided in the current memory.

In addition, while storing layer data in a storage region corresponding to a layer (i.e., the expansion layer data region, the fixed layer data region, or the base layer data region in the current memory) is referred to as "to arrange layer data in a layer" in the first embodiment, storing information indicating an assignment channel (i.e., a channel to be assigned) in a region corresponding to each channel strip of the expansion layer register, the fixed layer register, and the base layer register is referred to as "to arrange" in the second embodiment.

The base layer in the second embodiment is a layer for assigning channels to channel strips using layer data, similar to the base layer of the first embodiment. The base layer is the only layer that uses layer data to arrange a channel. That is, the other layers (i.e., the fixed layer and the expansion layer) do not use layer data. The base layer register is provided for each channel strip portion and includes regions for storing channels to be assigned respectively to eight channel strips in a base layer of the channel strip portion. When a base switch has been depressed, base layer data corresponding to the base switch is arranged in the base layer register.

In addition, it is assumed that one piece of layer data can be arranged in the base layer register and one of a plurality of prepared base layer data is selected and set in the base layer register using the base switch. A piece of base layer data is always arranged in the base layer register and the base layer register does not have a state in which no base layer data is arranged in the base layer register (except when the base layer register is in an initial state). The same number of channels as all eight channel strips are always arranged in the base layer register. There is no channel strip in which no channel is arranged in the base layer.

Layer data is not used in the fixed layer of the second embodiment although the fixed layer is a layer in which a channel specified by the user can be assigned, similar to the fixed layer of the first embodiment. Here, it is assumed that the user specifies a channel, which they desire to assign in the fixed layer, for each individual channel strip. Accordingly, fixed layer data is not present in the second embodiment. The fixed layer register is provided for each channel strip portion and includes regions for storing channels to be assigned respectively to eight channel strips in a fixed layer of the channel strip portion. There is no need to arrange the same number of channels as all channel strips in the fixed layer register and there may be a channel strip in which no channel is arranged. The fixed layer register may also have a state in which none of the channel strips is assigned with a channel.

Similar to the expansion layer of the first embodiment, the expansion layer is a layer for expanding and assigning a group of channels such as a DCA group or a channel set group to individual channel strips. However, layer data is not used in the expansion layer in the second embodiment. It is assumed that each group to be expanded is designated by the user. The expansion layer register is provided for each channel strip portion and includes regions for storing channels to be assigned respectively to eight channel strips in an expansion layer of the channel strip portion. Channels are arranged only for the same number of channel strips as the expanded channels in the expansion layer register. Since channels belonging to a group to be expanded are arranged in the expansion layer register, no channel may be arranged for some channel strip(s) if the number of the channels is less than 8. Of course, "none" indicating that no channel has been assigned is set in each of the regions of eight channel strips in the expansion layer register when expansion has not been instructed.

Figure 14:
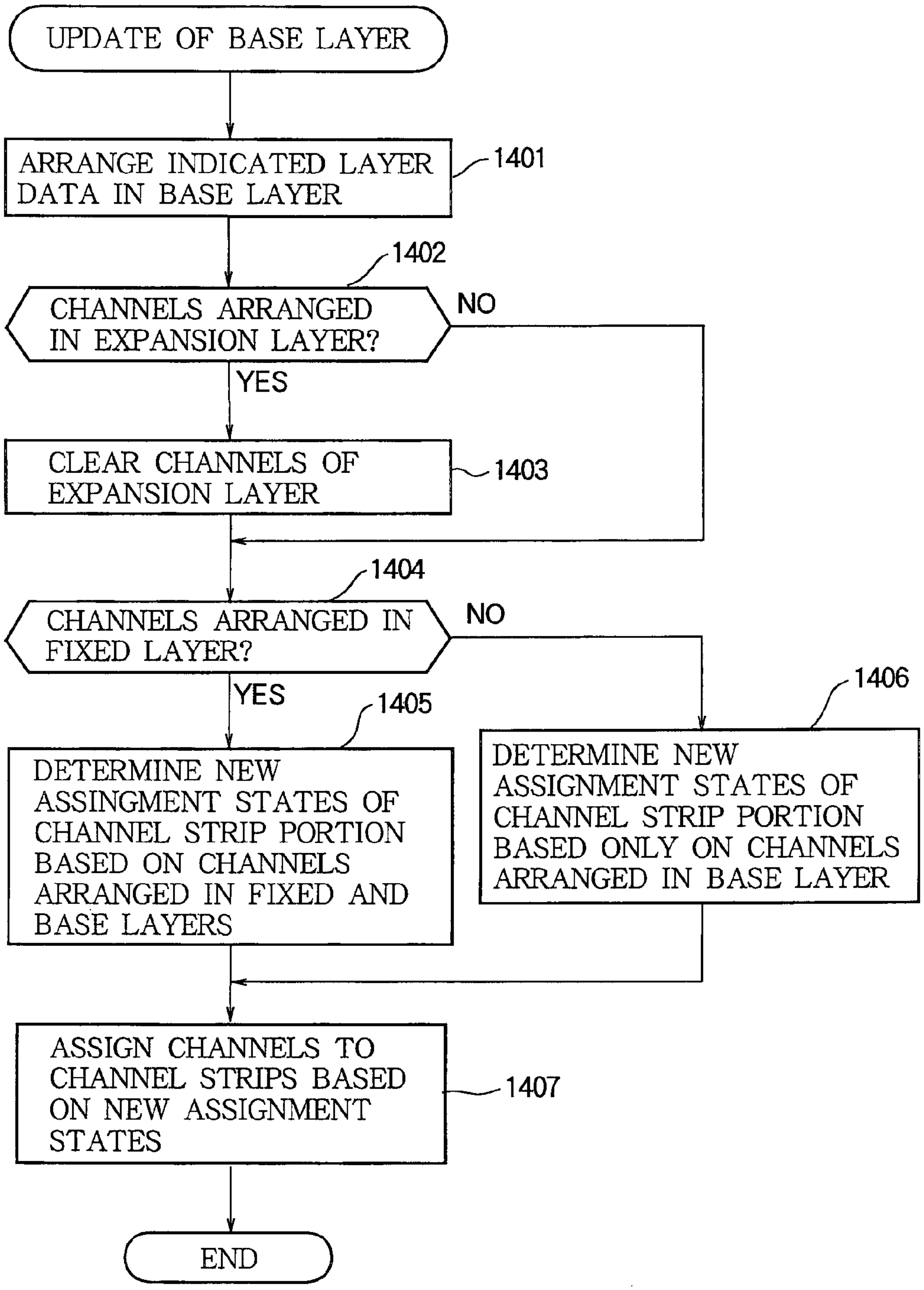
FIG. 14 is a flow chart illustrating a base layer update procedure.

FIG. 14 is a flow chart illustrating a base layer update procedure performed by the CPU 101. This procedure is activated when a base switch has been manipulated (i.e., when an instruction to arrange new base layer data has been detected). When a base switch is manipulated, base layer data and a channel strip portion corresponding to the manipulated base switch are specified and corresponding information is applied to this procedure.

In step 1401, the specified base layer data is arranged in a base layer of the specified channel strip portion. That is, the base layer data is written to a base layer register of the channel strip portion (i.e., assignment channels specified by the base layer data are written to the base layer register). In step 1401, in the case where different base layer data has already been arranged in the base layer register, the new base layer data is arranged in the base layer register, overwriting the different base layer data. Here, it is assumed that, in the case where custom layer data, which includes a channel strip to which no channel is assigned, has been arranged in the base layer, an assignment channel of layer data that has been immediately previously arranged in the base layer continues to be arranged for the channel strip. In step 1402, whether or not channels have been arranged in the expansion layer register of the channel strip portion is determined. Upon determining that channels have been arranged in the expansion layer register, the expansion layer register is cleared (i.e., all regions of channel strips of the expansion layer register are set to "none") in step 1403. Upon determining that no channels have been arranged in the expansion layer register, step 1403 is skipped.

Whether or not channels have been arranged in the fixed layer register of the channel strip portion is determined in step 1404. Upon determining that channels have been arranged in the fixed layer register, in step 1405, new assignment states of the channel strip portion are determined according to the channels arranged in each of the fixed layer register and the base layer register of the channel strip portion. Next, in step 1407, channels are assigned to the channel strips according to the new assignment states (i.e., channels are set in the assignment channel storage regions of the current memory). In the case where the assignment states of the channel strip portion 1304 have changed, display of the region 1302 is also updated according to the new assignment channels.

Upon determining in step 1404 that channels have not been arranged in the fixed layer register, in step 1406, new assignment states of the channel strip portion are determined based only on the channels arranged in the base layer register and the procedure then proceeds to step 1407. The procedure of steps 1404 to 1407 corresponds to the assignment process described above.

Figure 15:
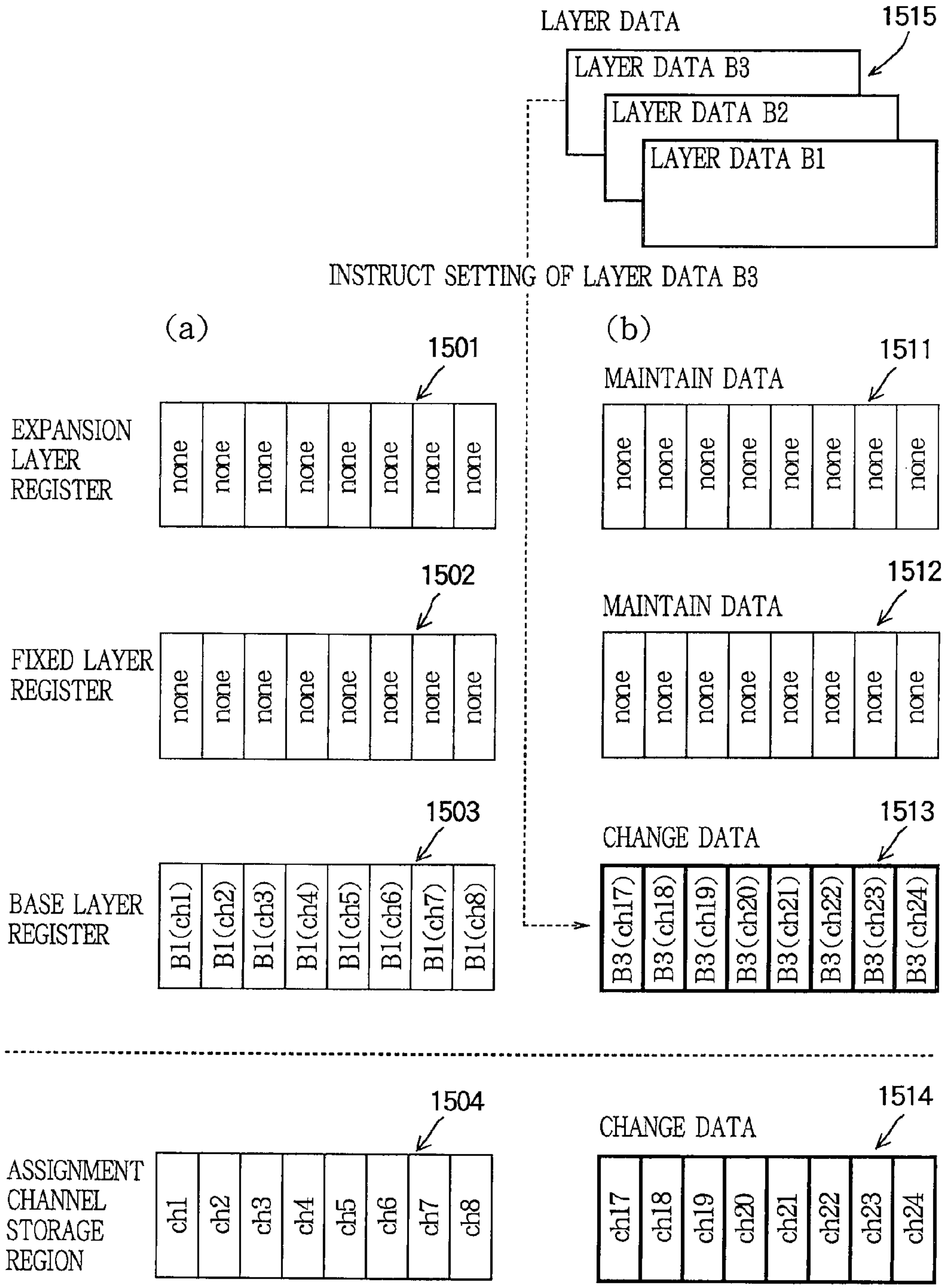
FIG. 15 illustrates first exemplary base layer change.

FIG. 15 illustrates a first example in which a base layer is changed through the procedure of FIG. 14. FIG. 15, part (a) shows the same state as FIG. 4, part (a). Specifically, base layer data selected by the switch B1 is arranged in the base layer register (1503) and channels are arranged in neither the fixed layer register nor the expansion layer register (1501, 1502). Reference numeral "1504" denotes an assignment state at this time. Here, let us assume that the procedure of FIG. 14 has been performed by turning the switch B3 on in the state of FIG. 15, part (a). FIG. 15, part (b) illustrates a state after the procedure of FIG. 14. Base layer data B3 is selected from a plurality of prepared base layer data 1515 and data of the base layer register is changed to data specified in the base layer data B3 as indicated by reference numeral "1513" through the process of step 1401 of FIG. 14. Since the unassigned state has been changed in neither the fixed layer nor the expansion layer (1511, 1512), the procedure proceeds through steps 1402→1404→1406. Through the processes of steps 1406 and 1407, assignment states are determined based only on the channels arranged in the base layer. As a result, the current data of the assignment channel storage region in the current memory becomes as indicated by reference numeral "1514".

Figure 16:
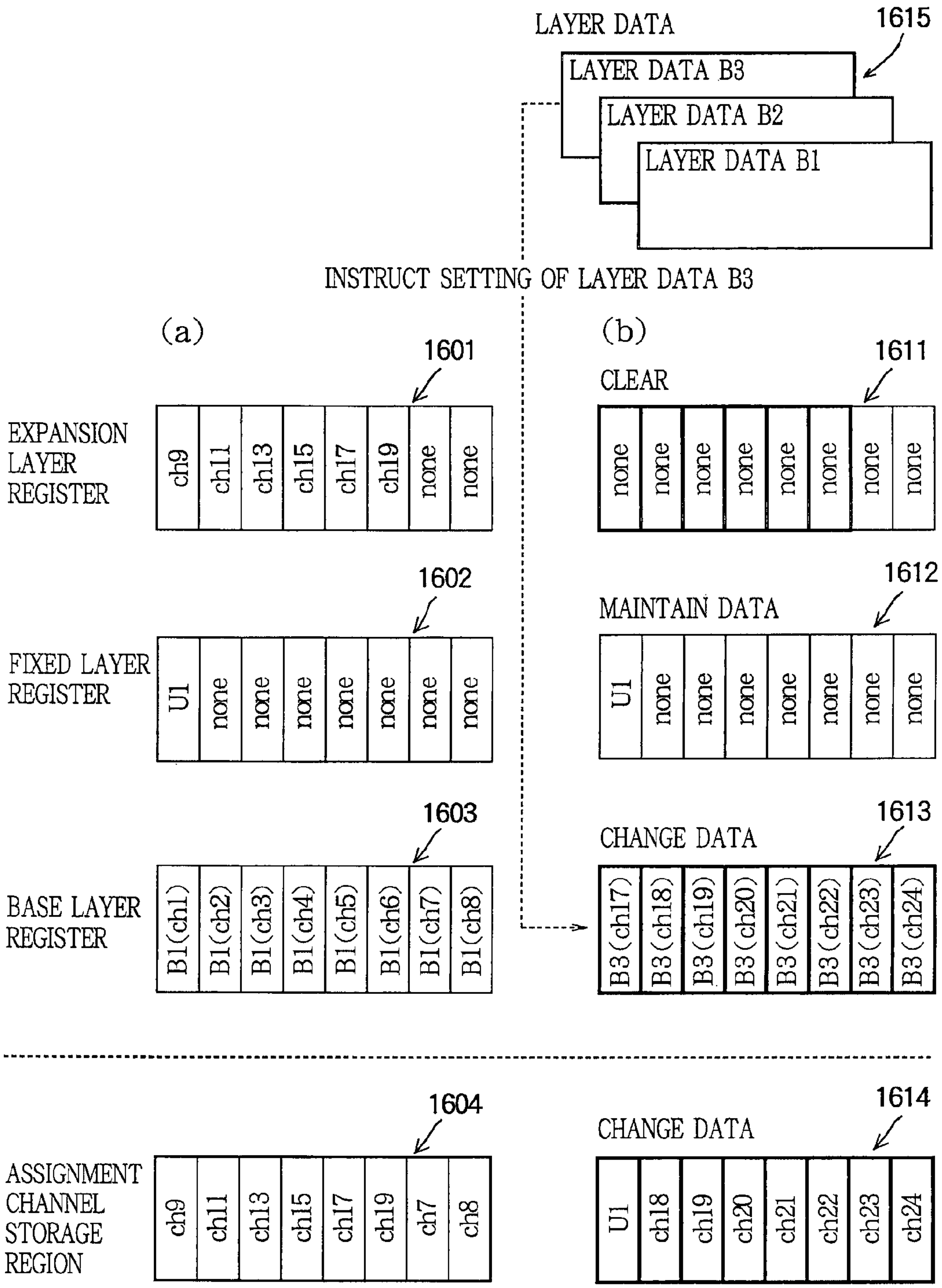
FIG. 16 illustrates second exemplary base layer change.

FIG. 16 illustrates a second example in which a base layer is changed through the procedure of FIG. 14. In FIG. 16, part (a), base layer data selected by the switch B1 is arranged in the base layer register (1603), a channel set group U1 is arranged for a channel strip 1 in the fixed layer register (1602), and channels into which the channel set group U1 is expanded are arranged in the expansion layer register (1601). Reference numeral "1604" denotes an assignment state at this time. Here, let us assume that the procedure of FIG. 14 has been performed by turning the switch B3 on in the state of FIG. 16, part (a). FIG. 16, part (b) illustrates a state after the procedure of FIG. 14. Base layer data B3 is selected from a plurality of prepared base layer data 1615 and data of the base layer register is changed to data specified in the base layer data B3 as indicated by reference numeral "1613" through the process of step 1401 of FIG. 14. Although the data of the base layer register has been changed, the data 1612 of the fixed layer register is the same as the current data 1602 since the change of the data of the base layer register does not affect the fixed layer. However, through the procedure of steps 1402→1403, the expansion layer is cleared to be brought into a state indicated by reference numeral "1611". Reference numeral "1614" denotes current data of the assignment channel storage regions in the current memory when the assignment process has been performed based on the data 1613 of the base layer register and the data 1612 of the fixed layer register through the procedure of steps 1404→1405→1407. The channel set group U1 specified in the data 1612 of the fixed layer register is assigned to the channel strip 1 and channels specified in the new base layer data 1613 are assigned to the channel strips 2 to 8. Accordingly, it is possible to switch channels assigned to channel strips, which have no assignment channels in the fixed layer, to new assignment channels of the base layer while fixedly using assignment channels specified in the fixed layer without leaving assignment channels of the expansion layer which has been temporarily expanded and used.

Figure 17:
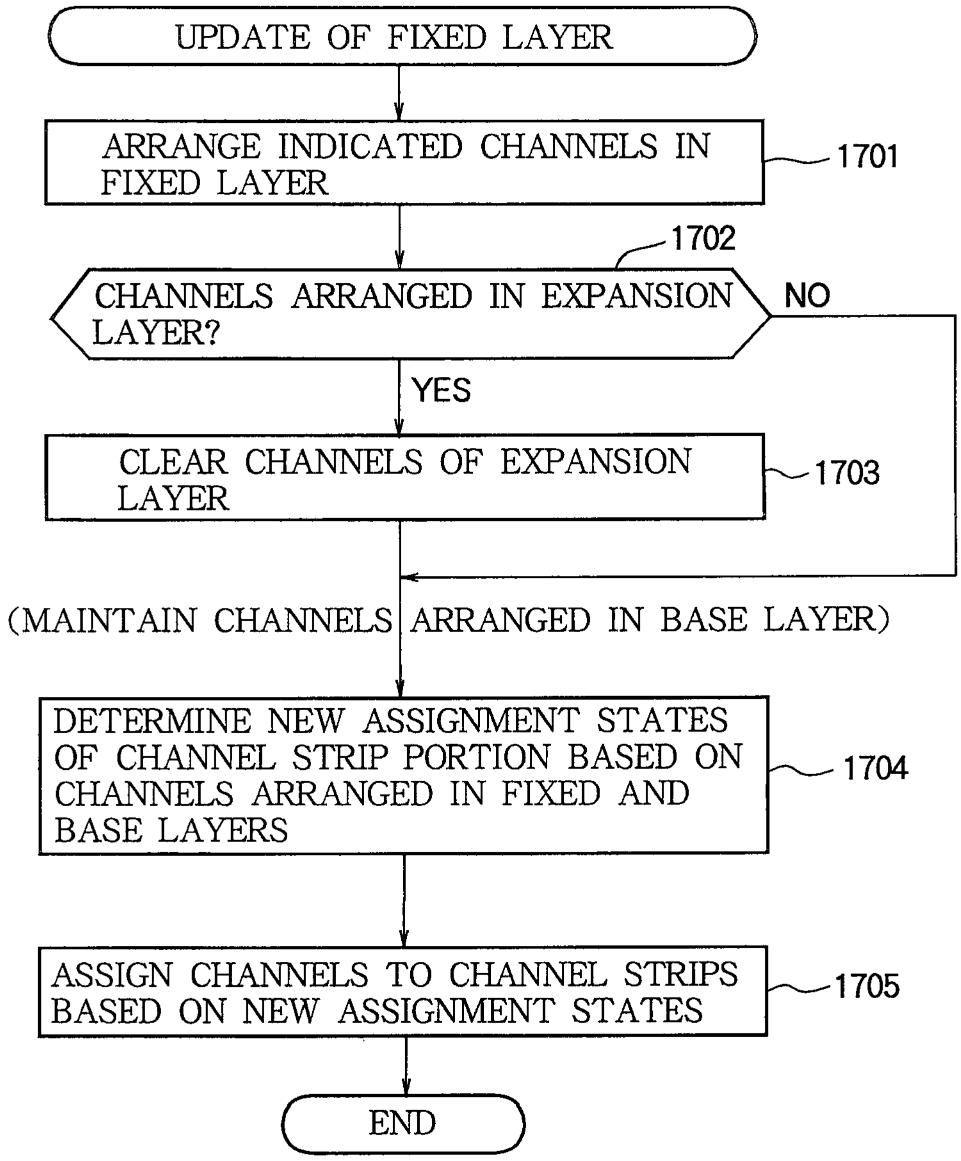
FIG. 17 is a flow chart illustrating a fixed layer update procedure.

FIG. 17 is a flow chart illustrating a fixed layer update procedure performed by the CPU 101 in the second embodiment. A fix set switch is manipulated to turn a fix set mode on. Then, this procedure is activated when a SEL switch in a channel strip is turned on in the fix set mode (i.e., when an instruction to set a new channel to a fixed layer has been detected). A channel strip portion corresponding to the manipulated fix set switch is specified and a channel corresponding to the SEL switch that has been turned on (i.e., a channel assigned to a channel strip including the SEL switch that has been turned on) is specified, and corresponding information is applied to this procedure.

In step 1701, the indicated (specified) channel is arranged in the fixed layer register of the indicated channel strip portion. That is, the indicated channel is written to a region corresponding to one channel strip in the fixed layer register of the channel strip portion. It is assumed that, basically, regions corresponding to channel strips in the fixed layer register of the channel strip portion are scanned sequentially from a region corresponding to the leftmost channel strip to search for a region corresponding to a channel strip, for which no channel has been arranged, and the indicated channel is written to the searched region. Here, regions in which channels have already been arranged remain unchanged. Alternatively, the user may also designate a region corresponding to a channel strip in the fixed layer register to which the indicated channel is to be written. The indicated channel may be overwritten to the designated region when a channel has already been arranged in the region. In addition, it is assumed that data of the fixed layer register can be cleared in units of channel strips through selection of a desired channel strip by the user. It is also possible to employ a configuration in which the indicated channel is written to the fixed layer register after all channels that have already been written to the fixed layer register are cleared (deleted).

In step 1702, whether or not channels have been arranged in the expansion layer register of the channel strip portion is determined. Upon determining that channels have been arranged in the expansion layer register, the expansion layer register is cleared (i.e., all regions of channel strips of the expansion layer register are set to "none") in step 1703. Upon determining that no channels have been arranged in the expansion layer register, step 1703 is skipped.

In step 1704, new assignment states of the channel strip portion are determined according to the channels arranged in each of the fixed layer register and the base layer register of the channel strip portion. Next, in step 1705, channels are assigned to the channel strips according to the new assignment states. In the case where the assignment states of the channel strip portion 1304 have changed, display of the region 1302 is also updated according to the new assignment channels. The procedure of steps 1704 and 1705 corresponds to the assignment process described above.

Figure 18:
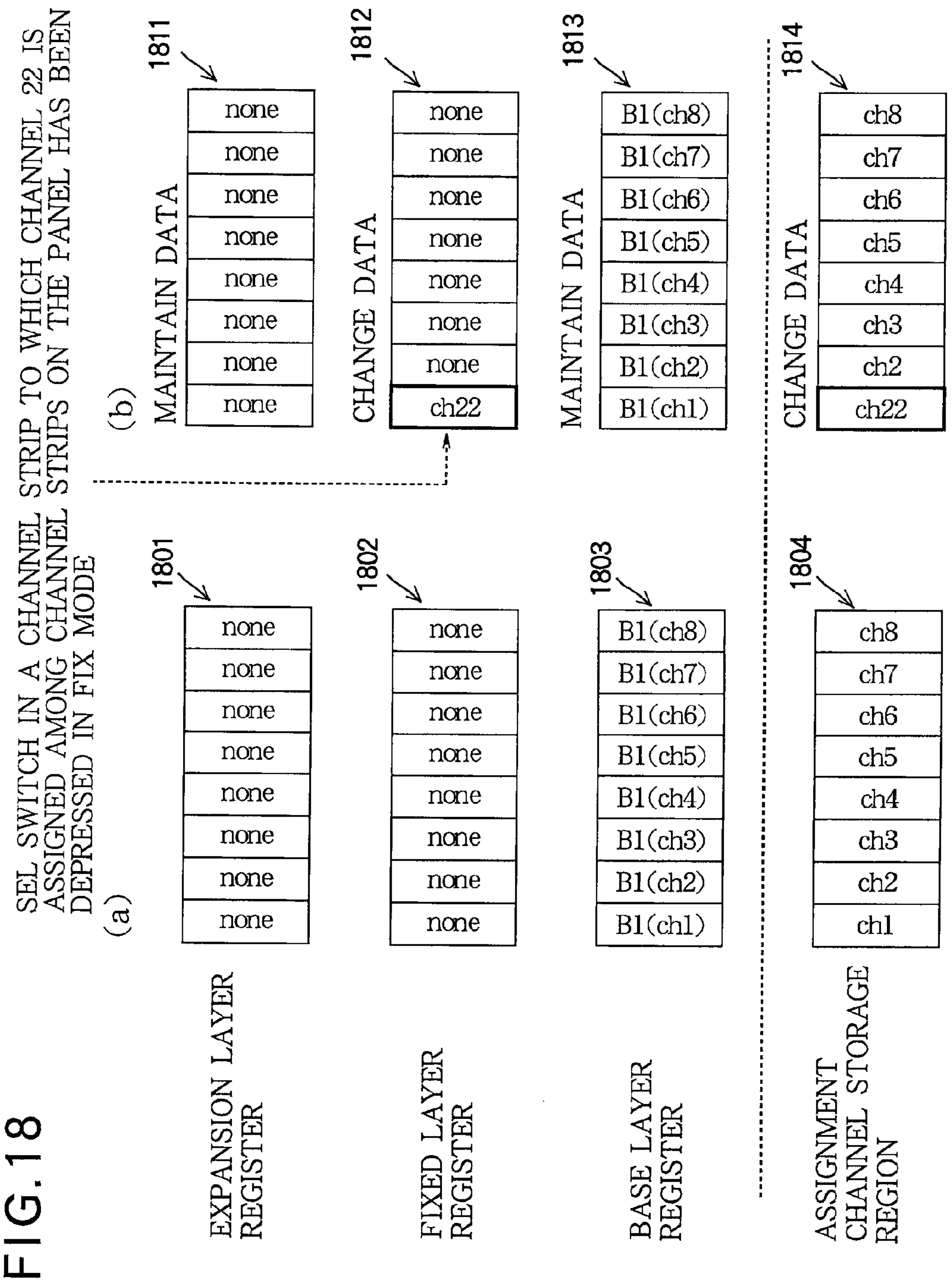
FIG. 18 illustrates a first example of fixed layer change.

FIG. 18 illustrates a first example in which a fixed layer is changed through the procedure of FIG. 17. FIG. 18, part (a) shows the same state as FIG. 4, part (a). Specifically, base layer data selected by the switch B1 is arranged as current data of the base layer (1803) and channels are arranged in neither the fixed layer register nor the expansion layer register (1801, 1802). Reference numeral "1804" denotes an assignment state at this time.

Here, let us assume that a fix set switch 1313 has been manipulated to turn a fix set mode on in the state of FIG. 18, part (a) and a SEL switch in a channel strip, to which the channel 22 has been assigned, among channel strips on the panel has then been turned on in the fix set mode to perform the procedure of FIG. 17. FIG. 18, part (b) illustrates a state after the procedure of FIG. 17. Through the process of step 1701 of FIG. 17, the channel 22 is newly arranged in a region corresponding to the channel strip 1 in the fixed layer register (1812). Since this change does not affect the base layer, data 1813 in the base layer register is the same as the data 1803. Since the expansion layer has not been changed from the unassigned state (1811), the procedure proceeds through steps 1702→1704→1705. Through the processes of steps 1704 and 1705, assignment states are determined based on the channels arranged in the fixed layer and the base layer. As a result, the current data of the assignment channel storage region in the current memory becomes as indicated by reference numeral "1814".

Figure 19:
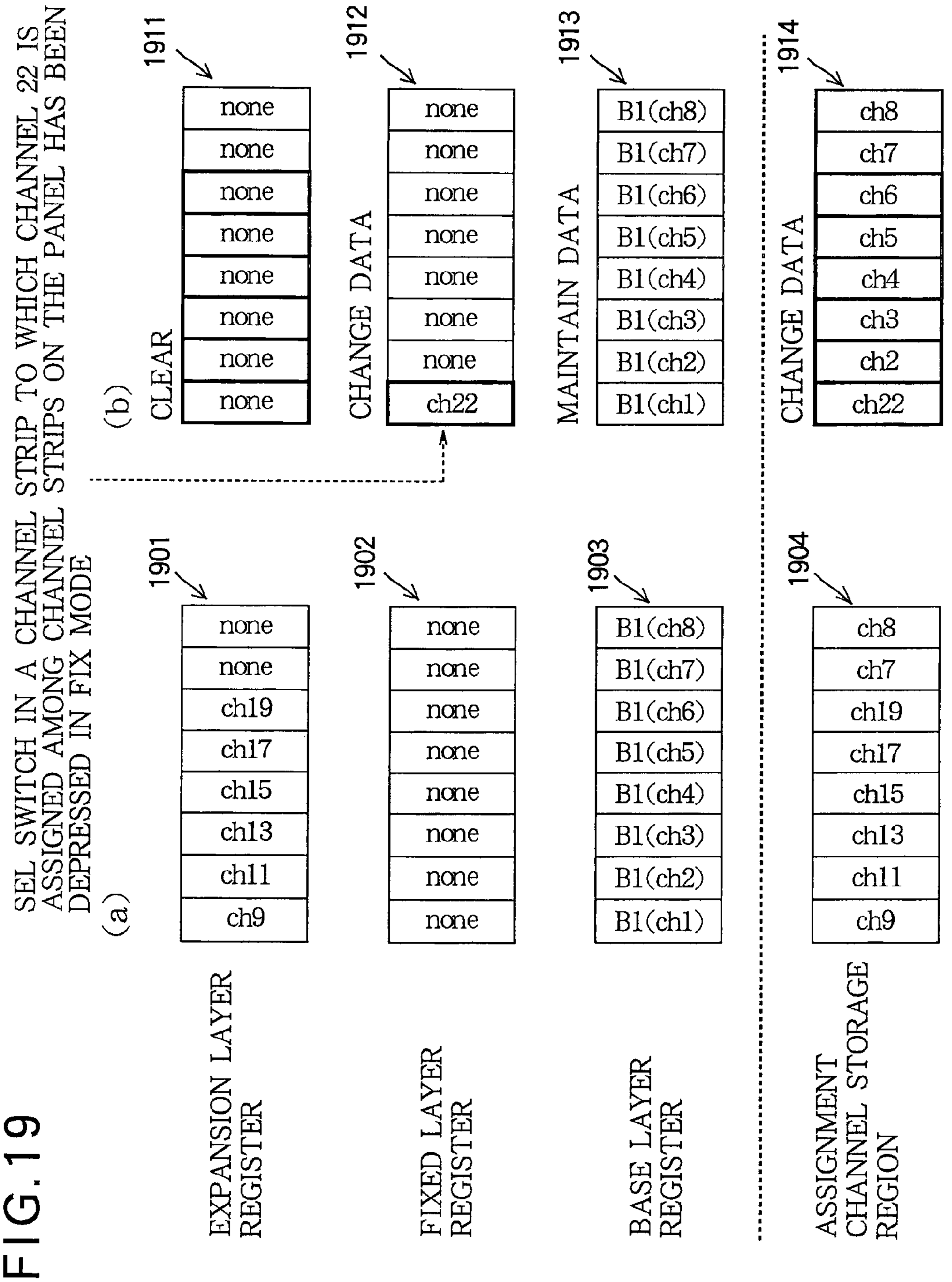
FIG. 19 illustrates a second example of fixed layer change.

FIG. 19 illustrates a second example in which a fixed layer is changed through the procedure of FIG. 17. In, FIG. 19, part (a), base layer data selected by the switch B1 is arranged as current data of the base layer (1903), channels are not arranged in the fixed layer register (1902), and channels into which a channel set group is expanded are arranged in the expansion layer register (1901). Reference numeral "1904" denotes an assignment state at this time.

Here, let us assume that a fix set switch 1313 has been manipulated to turn a fix set mode on in the state of FIG. 19, part (a) and a SEL switch in a channel strip, to which the channel 22 has been assigned, among channel strips on the panel has then been turned on in the fix set mode to perform the procedure of FIG. 17. FIG. 19, part (b) illustrates a state after the procedure of FIG. 17. Through the process of step 1701 of FIG. 17, the channel 22 is newly arranged in a region corresponding to the channel strip 1 in the fixed layer register (1912). Since this change does not affect the base layer, data 1913 in the base layer register is the same as the data 1903. However, through the procedure of steps 1702→1703, the expansion layer is cleared to be brought into a state indicated by reference numeral "1911". Reference numeral "1914" denotes current data of the assignment channel storage regions in the current memory when the assignment process has been performed based on the data 1913 of the base layer register and the data 1912 of the fixed layer register through the procedure of steps 1704→1705. The channel 22 specified in the data 1912 of the fixed layer register is assigned to the channel strip 1 and channels specified in the base layer data 1913 are assigned to the channel strips 2 to 8. Accordingly, it is possible to maintain assignment channels of the base layer for channel strips which have no assignment channels in the new fixed layer while switching the other assignment channels to assignment channels specified in the new fixed layer without leaving assignment channels specified in the expansion layer which has been temporarily expanded and used.

Figure 20:
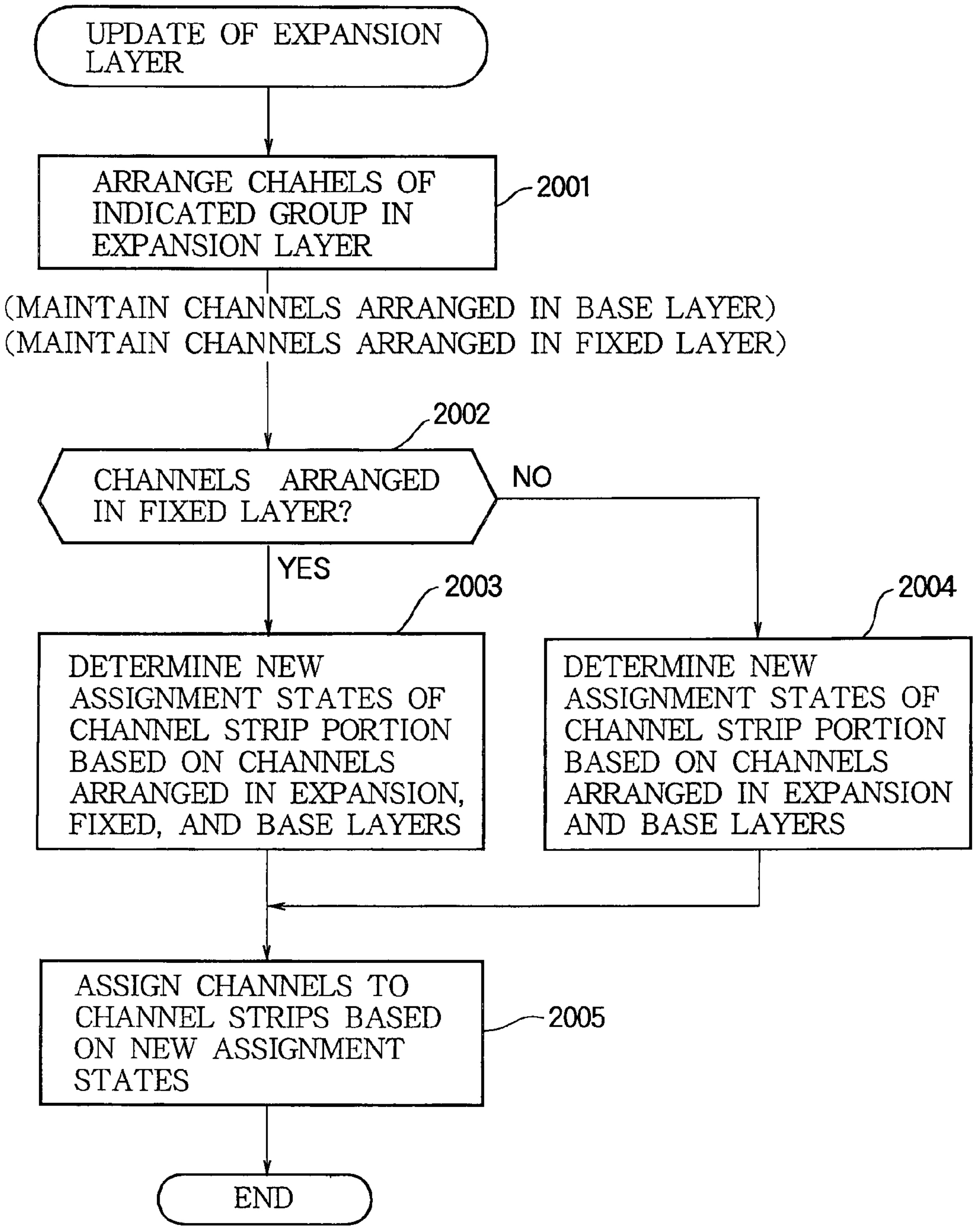
FIG. 20 is a flow chart illustrating an expansion layer update procedure.

FIG. 20 is a flow chart illustrating an expansion layer update procedure performed by the CPU 101 in the second embodiment. This procedure is activated when a manipulation for instructing expansion layer update has been performed. The manipulation for instructing expansion layer update is a manipulation for instructing expansion layer update while designating a group such as a DCA group or a channel set group to be expanded. Specifically, the manipulation for instructing expansion layer update is a manipulation of depressing the expansion switch 1314 or 1318 in a state in which one group has been designated. Information specifying a channel strip portion corresponding to the manipulated expansion switch and information specifying a group, expansion of which has been instructed, are applied to this procedure.

In step 2001, a plurality of channels included in the specified (indicated) group is expanded into individual channels and the channels are arranged in an expansion layer of the indicated channel strip portion. That is, channels included in the indicated group are written one by one to regions corresponding to the channel strips in the expansion layer register of the channel strip portion in order from the leftmost channel strip. In the case where some channels have already been arranged in the expansion layer, new channels are arranged in the expansion layer, overwriting corresponding data. Alternatively, all data in the expansion layer register is cleared before channels of a newly indicated group are written to the expansion layer register. In step 2002, whether or not channels have been arranged in the fixed layer of the channel strip portion is determined. Upon determining that channels have been arranged in the fixed layer, in step 2003, new assignment states are determined according to channels arranged in the expansion layer register, the fixed layer register, and the base layer register of the channel strip portion. Next, in step 2005, channels are assigned to the channel strips according to the new assignment states. In the case where the assignment states of the channel strip portion 1304 have changed, display of the region 1302 is also updated according to the new assignment channels.

Upon determining in step 2002 that channels have not been arranged in the fixed layer, in step 2004, new assignment states of the channel strip portion are determined based on channels arranged in the expansion layer register and the base layer register, and the procedure then proceeds to step 2005. As described above, when a channel arranged in the highest layer (the expansion layer in this embodiment) has been changed, the CPU 101 performs a control operation to maintain all channels arranged in the other layers (i.e., so as not to clear any register of the layers). The procedure of steps 2002 to 2005 corresponds to the assignment process described above.

Figure 21:
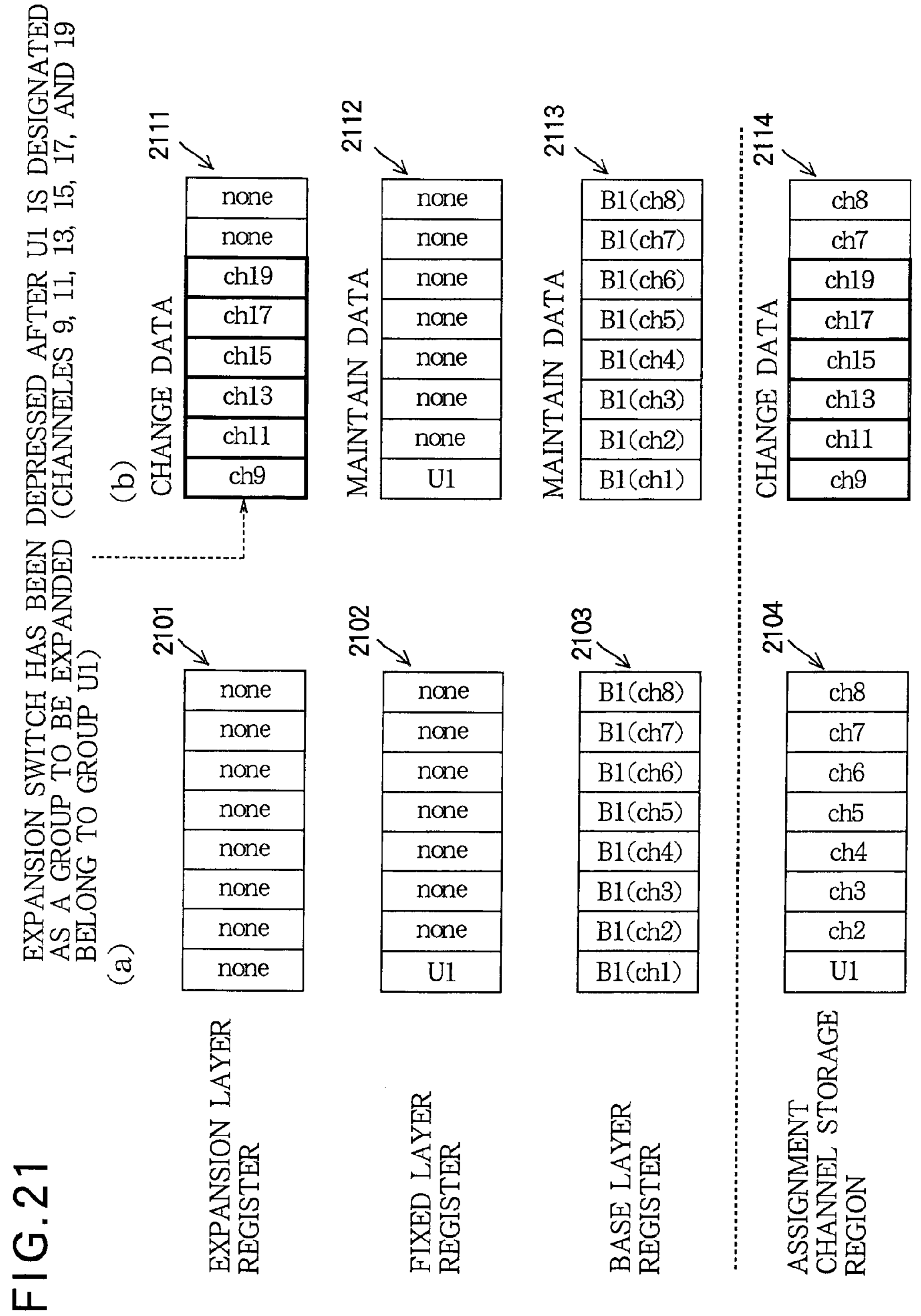
FIG. 21 illustrates exemplary expansion layer change.

FIG. 21 illustrates an example in which an expansion layer of a channel strip portion is changed through the procedure of FIG. 20. In FIG. 21, part (a), base layer data selected by the switch B1 is arranged as current data of the base layer (2103), a channel set group U1 is arranged for a channel strip 1 in the fixed layer register (2102), and channels are not arranged in the expansion layer register (2101). Reference numeral "2104" denotes an assignment state at this time. Here, let us assume that the procedure of FIG. 20 has been performed by designating a channel set group U1 and turning the expansion switch 1314 on in the state of FIG. 21, part (a). FIG. 21, part (b) illustrates a state after the procedure of FIG. 20. Through the process of step 2001 of FIG. 20, channels (channels 9, 11, 13, 15, 17, and 19) belonging to the channel set group U1 are arranged in the expansion layer register (2111). Since this change of the expansion layer does not affect the base layer and the fixed layer, data 2113 of the base layer register is the same as the data 2103 and data 2112 of the fixed layer register is the same as the data 2102. Reference numeral "2114" denotes current data of the assignment channel storage regions in the current memory when the assignment process has been performed based on the current data 2111 to 2113 of the layers through the procedure of steps 2002→2003→2005. Channels of the channel set group U1 specified in the new expansion layer data 2111 are assigned respectively to the channel strips 1 to 6 and channels are assigned to the channel strips 7 and 8, which have no assignment channels in the expansion layer and the fixed layer, according to the data 2113 of the base layer register. Accordingly, it is possible to apply assignment channels specified in the data of the new expansion layer register while maintaining assignment channels of the base layer and the fixed layer for channel strips which have no assignment channels in the expansion layer register.

The following is a description of layer release. The release switch 1311 of FIG. 13 is a switch for issuing an instruction to clear channels arranged in the highest layer among the three layers of the channel strip portion 1304. When the release switch 1311 is depressed, the highest layer in which channel(s) are arranged is identified, (1) only the expansion layer is cleared if the highest layer is the expansion layer, (2) only the fixed layer is cleared if the highest layer is the fixed layer, and the assignment process is re-performed. If the highest layer in which channel(s) are arranged is the base layer, the current state of assignment of channels to channel strips is maintained without clearing the layer.

Figure 22:
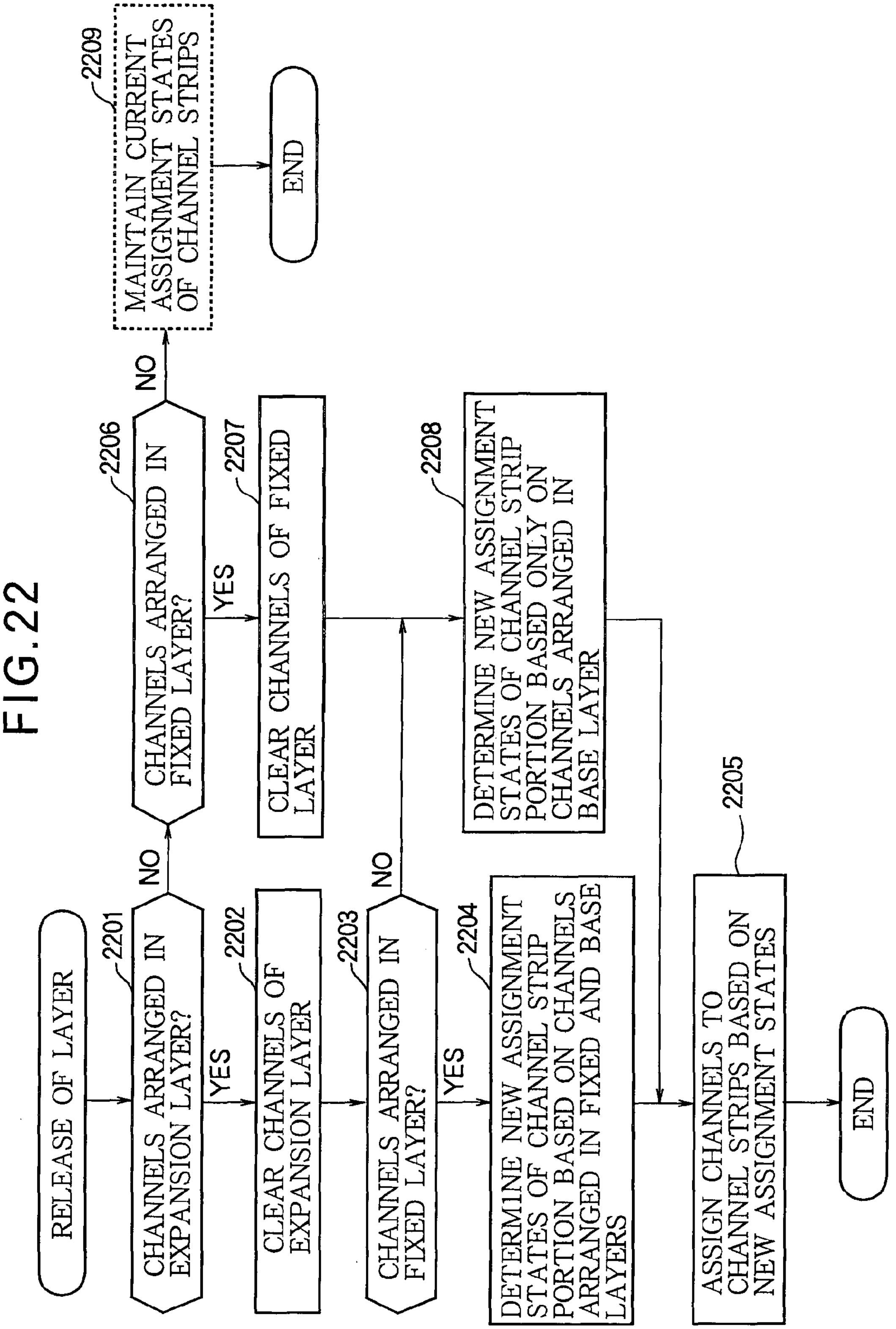
FIG. 22 is a flow chart illustrating a layer release procedure.

FIG. 22 is a flow chart illustrating a layer release procedure performed by the CPU 101 in the second embodiment. This procedure is activated when a manipulation for instructing layer release has been performed. The manipulation for instructing layer release is a manipulation for instructing release of the highest layer among layers in which channels are arranged. Specifically, the manipulation for instructing layer release is a manipulation of depressing the release switch 1311 or 1315. Information specifying a channel strip portion corresponding to the depressed release switch is applied to this procedure.

In step 2201, whether or not channels have been arranged in an expansion layer of the channel strip portion is determined. Upon determining that channels have been arranged in the expansion layer, all data of the expansion layer register is cleared (i.e., all regions of channel strips of the expansion layer register are set to "none") in step 2202. Then, whether or not channels have been arranged in a fixed layer of the channel strip portion is determined in step 2203. Upon determining that channels have been arranged in the fixed layer, in step 2204, new assignment states of the channel strip portion are determined according to the channels arranged in each of the fixed layer register and the base layer register of the channel strip portion. Next, in step 2205, channels are assigned to the channel strips according to the new assignment states. In the case where the assignment states of the channel strip portion 1304 have changed, display of the region 1302 is also updated according to the new assignment channels. Upon determining in step 2203 that channels have not been arranged in the fixed layer register, in step 2208, new assignment states of the channel strip portion are determined based only on the channels arranged in the base layer register of the channel strip portion and the procedure then proceeds to step 2205.

Upon determining in step 2201 that channels have not been arranged in the expansion layer register, whether or not channels have been arranged in the fixed layer register of the channel strip portion is determined in step 2206. Upon determining that channels have been arranged in the fixed layer register, data of the fixed layer register of the channel strip portion is cleared (i.e., all regions of channel strips of the fixed layer register are set to "none") in step 2207 and the procedure proceeds to step 2208. Upon determining in step 2206 that channels have not been arranged in the fixed layer register, the current state of assignment of channels to the channel strips of the channel strip portion remains unchanged in step 2209. The procedure of steps 2203 to 2205 corresponds to the assignment process described above.

Figure 23:
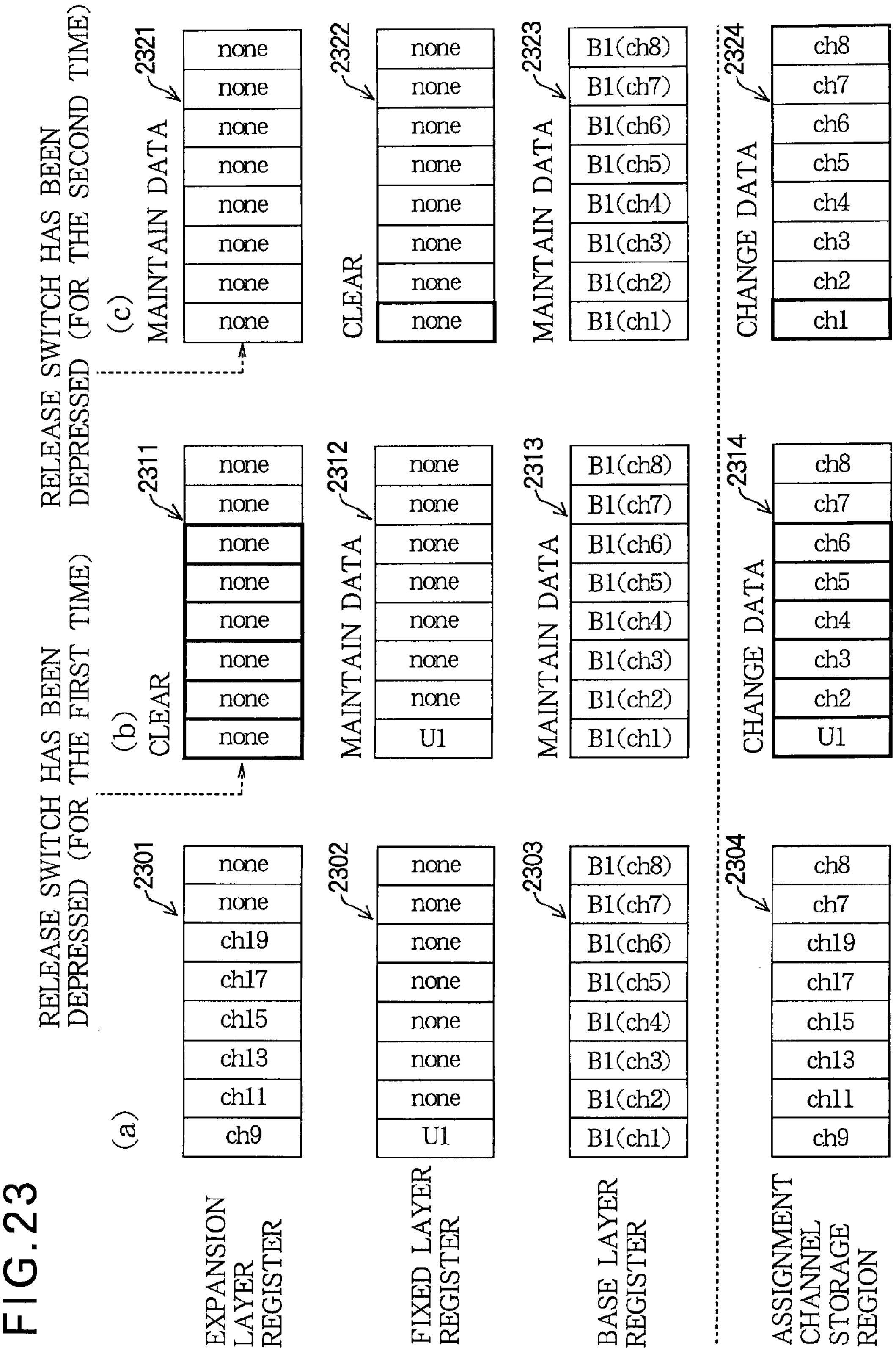
FIG. 23 illustrates exemplary layer release.

FIG. 23 illustrates exemplary layer release. FIG. 23, part (a) shows the same state as FIG. 21, part (b). Specifically, base layer data selected by the switch B1 is arranged as current data of the base layer (2303), a channel set group U1 is arranged for the channel strip 1 in the fixed layer register (2302), and channels into which the channel set group U1 is expanded are arranged in the expansion layer register (2301). Reference numeral "2304" denotes an assignment state at this time.

Here, let us assume that the procedure of FIG. 22 has been performed by turning the release switch 1311 on in the state of FIG. 23, part (a). FIG. 23, part (b) illustrates a state after the procedure of FIG. 22. Through the procedure of steps 2201→2202, the expansion layer which is the highest layer among layers in which layer data is arranged is cleared to be brought into a state in which no channels are arranged as indicated by reference numeral "2311". States of the fixed layer and the base layer are not changed from states 2302 and 2303 as indicated by reference numeral "2312" and "2313". Reference numeral "2314" denotes current data of the assignment channel storage regions when the assignment process has been performed based on the current data 2313 and 2312 of the base layer and the fixed layer through the procedure of steps 2203→2204→2205.

Here, let us assume that a new procedure of FIG. 22 has been performed by turning the release switch on again in the state of FIG. 23, part (b). FIG. 23, part (c) illustrates a state after the new procedure of FIG. 22. Through the procedure of steps 2201→2206→2207, the fixed layer which is the highest layer among layers in which channels are arranged in FIG. 23, part (b) is cleared to be brought into a state in which no channels are arranged as indicated by reference numeral "2322". States of the expansion layer and the base layer are not changed from states 2311 and 2313 as indicated by reference numeral "2321" and "2323". Reference numeral "2324" denotes current data of the assignment channel storage regions when the assignment process has been performed based on the data 2323 of the base layer register through the procedure of steps 2208→2205. In this manner, layers are cleared sequentially from the highest layer one by one each time the release switch is turned on.

Although, for example, as indicated by reference numeral "401" and "402" in FIG. 4, the first embodiment has been described with reference to the "state in which layer data has not been arranged in the expansion layer or the fixed layer", it is, of course, possible that layer data specifying that all channel strips have no assignment channels is prepared and, when the layer data has been arranged, this arrangement is handled in the same way as the "state in which layer data has not been arranged".

Although assignment channel storage regions are provided in the current memory in the first and second embodiments, the storage regions are not necessarily provided. Channels for assignment to channel strips may also be determined based on the arrangement state of each layer each time there is a need to specify channels for assignment to channel strips.

Although the first and second embodiments have been described above with reference to a DCA group and a channel set group as an example of a grouping function for collectively controlling a plurality of channels, the invention may also be applied to other grouping functions. For example, the invention may be applied to a mute group or a link group.

In the first and second embodiments, a clearing section of the audio signal processing apparatus clears a setting (namely, layer data) stored in a storing section (for example, a register or current memory) by physically deleting or erasing the contents of the storing section. The technical meaning of "clearing" is to disable the setting so that the cleared setting no more influences the assignment of channels to a channel strip. Therefore, the clearing action may include not only the physical erasing of layer data, but also may include logical erasing such as setting an invalid flag to the layer data.

In accordance with one aspect of the invention, there is provided an audio signal processing apparatus for performing audio signal processing on a plurality of channels, the apparatus including a current memory that stores values of various parameters for controlling the audio signal processing for each channel, a channel strip portion including a plurality of channel strips, each including controls for adjusting the values of the parameters, a first memory region, a second memory region, and a third memory region which are independent of each other and in each of which data specifying states of assignment of channels to the channel strips is arranged, an assignment channel storage region that stores current states of assignment of the channels to the channel strips, and an assignment means that assigns channels to the channel strips by setting current assignment states in the assignment channel storage region according to data arranged in the first to third memory regions, wherein, when assigning a channel to each channel strip, the assignment means adopts assignment states represented by data arranged in the second memory region with higher priority than assignment states represented by data arranged in the first memory region and adopts assignment states represented by data arranged in the third memory region with higher priority than assignment states represented by data arranged in the first and second memory regions.

In accordance with another aspect of the invention, there is provided the audio signal processing apparatus further including a release control for instructing release of data arranged in the memory regions and a release means that determines whether or not data specifying a channel assigned to a channel strip has been arranged in the third memory region when an instruction to release has been issued through the release means, clears all data arranged in the third memory region upon determining that data specifying a channel assigned to a channel strip has been arranged in the third memory region, determines whether or not data specifying a channel assigned to a channel strip has been arranged in the second memory region upon determining that no data specifying a channel assigned to a channel strip has been arranged in the third memory region, and clears all data arranged in the second memory region while maintaining data arranged in the first memory region without change upon determining that data specifying a channel assigned to a channel strip has been arranged in the second memory region, and an assignment update means that updates assignment of channels to the channel strips according to data arranged in each of the memory regions through the assignment means after the release means performs an operation.

In accordance with another aspect of the invention, there is provided the audio signal processing apparatus further including a first instruction means that instructs arrangement of new data in the first memory region, a second instruction means that instructs arrangement of new data in the second memory region, a first memory region update means that arranges, upon detecting that arrangement of new data has been instructed through the first instruction means, the new data in the first memory region while maintaining data recorded in the second memory region without change and clearing all data arranged in the third memory region to release the data of the third memory region, a second memory region update means that arranges, upon detecting that arrangement of new data has been instructed through the second instruction means, the new data in the second memory region while maintaining data recorded in the first memory region without change and clearing all data arranged in the third memory region to release the data of the third memory region, and an assignment update means that updates, through the assignment means, assignment of channels to the channel strips according to data in each memory region after the release is performed.

In accordance with another aspect of the invention, there is provided an audio signal processing apparatus for performing audio signal processing on a plurality of channels, the apparatus including a channel strip portion including a plurality of channel strips, each including controls for adjusting various parameters for controlling audio signal processing, a first memory region for arranging therein data specifying channels assigned respectively to all of the plurality of channel strips of the channel strip portion, a second memory region for arranging therein data specifying channels assigned respectively to desired channel strips among the plurality of channel strips of the channel strip portion, a third memory region for arranging therein data specifying channels assigned respectively to desired channel strips among the plurality of channel strips of the channel strip portion, an assignment means that (1) assigns a channel to each channel strip, for which a channel to be assigned has been specified in data arranged in the third memory region, based on data arranged in the third memory region, (2) assigns a channel to each channel strip, for which a channel to be assigned has not been specified in data arranged in the third memory region and a channel to be assigned has been specified in data arranged in the second memory region, based on data arranged in the second memory region, and (3) assigns a channel to each channel strip, for which a channel to be assigned has been specified in neither data arranged in the second memory region nor data arranged in the third memory region, based on data arranged in the first memory region, a first layer setting control for issuing an instruction to arrange designated data in the first memory region, a second layer setting control for issuing an instruction to arrange designated data in the second memory region, and an assignment change means that overwrites, when an instruction is issued through the first layer setting control or the second layer setting control, data of the first memory region or the second memory region with designated data according to the instruction while clearing data arranged in the third memory region and then performs channel assignment through the assignment means.

In accordance with another aspect of the invention, there is provided the audio signal processing apparatus, wherein the first memory region, the second memory region, and the third memory region are provided in a current memory that stores various parameters used to perform audio signal processing on the plurality of channels.

In accordance with another aspect of the invention, there is provided the audio signal processing apparatus, wherein arrangement of data in the first memory region is performed by setting base layer data, specifying channels assigned respectively to all of the plurality of channel strips of the channel strip portion, in the first memory region, and arrangement of data in the second memory region is performed by setting fixed layer data, specifying channels assigned respectively to all or part of the plurality of channel strips of the channel strip portion, in the second memory region.

In accordance with another aspect of the invention, there is provided the audio signal processing apparatus, wherein each of the first memory region, the second memory region, and the third memory region is a register region provided in a desired storage means.

In accordance with another aspect of the invention, there is provided the audio signal processing apparatus further including a designation means for designating channels assigned respectively to all or part of the plurality of channel strips of the channel strip portion, wherein arrangement of data in a register of the second memory region is performed by setting a channel designated by the designation means in the register of the second memory region.

In accordance with another aspect of the invention, there is provided the audio signal processing apparatus wherein a channel assigned to one of the channel strips includes a channel group into which channels have been grouped to enable collective manipulation of the grouped channels.

In accordance with another aspect of the invention, there is provided the audio signal processing apparatus wherein arrangement of data in the third memory region is performed by setting, in the third memory region, data for expanding the channel group into channels and assigning the expanded channels to channel strips.

In accordance with a further aspect of the invention, there is provided an audio signal processing apparatus for performing audio signal processing on a plurality of channels, the apparatus including a channel strip portion including a plurality of channel strips, each including controls for adjusting various parameters for controlling audio signal processing, a first memory region for arranging therein data specifying channels assigned respectively to all of the plurality of channel strips of the channel strip portion, a second memory region for arranging therein data specifying channels assigned respectively to desired channel strips among the plurality of channel strips of the channel strip portion, a third memory region for arranging therein data specifying channels assigned respectively to desired channel strips among the plurality of channel strips of the channel strip portion, an assignment means that (1) assigns a channel to each channel strip, for which a channel to be assigned has been specified in data arranged in the third memory region, based on data arranged in the third memory region, (2) assigns a channel to each channel strip, for which a channel to be assigned has not been specified in data arranged in the third memory region and a channel to be assigned has been specified in data arranged in the second memory region, based on data arranged in the second memory region, and (3) assigns a channel to each channel strip, for which a channel to be assigned has been specified in neither data arranged in the second memory region nor data arranged in the third memory region, based on data arranged in the first memory region, a release control, and a release means that (1) clears all data of the third memory region and re-performs assignment when assignment based on data arranged in the third memory region has been performed, (2) clears all data of the second memory region and re-performs assignment when assignment based on data arranged in the third memory region has not been performed and assignment based on data arranged in the second memory region has been performed, and (3) maintains current assignment states without clearing any of the memory regions when neither assignment based on data arranged in the second memory region nor assignment based on data arranged in the third memory region have been performed.

What is claimed is:

1. An audio signal processing apparatus for performing an audio signal process composed of a plurality of channels each having parameters used in the audio signal process, the audio signal processing apparatus comprising:

a plurality of channel strips, each channel strip assigned a channel and provided with controls for adjusting values of the parameters of the assigned channel;

a plurality of storing sections having different priorities relative to each other, each storing section capable of storing a setting indicative of a channel to assign to a channel strip;

a changing section that changes a setting stored in a storing section;

a clearing section that clears a setting stored in a storing section; and an assigning section that is activated when a setting stored in one of the plurality of the storing sections is changed by the changing section or cleared by the clearing section, refers to the storing sections that currently store settings for a channel strip, and assigns a channel to the channel strip according to the setting stored in a storing section having the highest priority among the storing sections referred to by the assigning section.

2. The audio signal processing apparatus according to claim 1, wherein the clearing section automatically clears a first setting stored in a first one of the plurality of the storing sections when the changing section changes a second setting stored in a second one of the plurality of the storing sections, the second one being different from the first one of the storing sections.

3. The audio signal processing apparatus according to claim 1, wherein the clearing section automatically clears a first setting stored in a first one of the plurality of the storing sections, the first one having a higher priority than a second one of the plurality of the storing sections, when the changing section changes a second setting stored in the second one of the storing sections.

4. The audio signal processing apparatus according to claim 1, wherein the clearing section automatically clears a first setting stored in a first one of the plurality of the storing sections, the first one having the highest priority among the plurality of the storing sections, when the changing section changes a second setting stored in a second one of the plurality of the storing sections, the second one not having the highest priority.

5. The audio signal processing apparatus according to claim 4, wherein the clearing section does not clear a setting stored in any of the plurality of the storing sections when the changing section changes the first setting stored in the first one of the storing sections having the highest priority.

6. The audio signal processing apparatus according to claim 1, further comprising: an instructing section that inputs a clearing instruction; and a detecting section that detects one of the plurality of the storing sections in response to the clearing instruction, wherein the clearing section clears the setting stored in the detected one of the storing sections.

7. The audio signal processing apparatus according to claim 6, wherein the detecting section detects the storing section which has a priority other than the lowest priority among the plurality of the storing sections and which has a highest priority among a group of storing sections that currently store the settings.

8. The audio signal processing apparatus according to claim 6, wherein the clearing section does not clear a setting stored in the plurality of the storing sections when the detecting section detects none of the storing sections in response to the clearing instruction.

9. A method of performing an audio signal process composed of a plurality of channels each having parameters used in the audio signal process, in an audio signal processing apparatus having a memory and a plurality of channel strips, each channel strip assigned a channel and provided with controls for adjusting values of the parameters of the assigned channel, the method comprising the steps of:

defining, in the memory, a plurality of storing sections having different priorities relative to each other, each storing section capable of storing a setting indicative of a channel to assign to a channel strip;

changing a setting stored in a storing section;

clearing a setting stored in a storing section;

referring to all of the storing sections that currently store settings for a channel strip when a setting stored in one of the plurality of the storing sections is changed by the changing step or cleared by the clearing step; and assigning a channel to the channel strip according to the setting stored in a storing section having the highest priority among the storing sections referred to by the referring step.

* * * * *